(12) United States Patent
Moriya et al.

(10) Patent No.: US 7,861,690 B2
(45) Date of Patent: Jan. 4, 2011

(54) DEVICE AND METHOD FOR CONTROLLING INTERNAL COMBUSTION ENGINE

(75) Inventors: Hidenori Moriya, Susono (JP);
Masahiro Wanibe, Nagoya (JP);
Hiromichi Yasuda, Susono (JP);
Ryusuke Ogino, Sunto-gun (JP); Ryo Tadokoro, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 104 days.

(21) Appl. No.: 12/085,589

(22) PCT Filed: Nov. 28, 2006

(86) PCT No.: PCT/JP2006/324136
§ 371 (c)(1),
(2), (4) Date: Jul. 25, 2008

(87) PCT Pub. No.: WO2007/064005
PCT Pub. Date: Jun. 7, 2007

(65) Prior Publication Data
US 2008/0319633 A1 Dec. 25, 2008

(30) Foreign Application Priority Data
Nov. 29, 2005 (JP) ............................ 2005-344426

(51) Int. Cl.
*F02P 5/00* (2006.01)
*F01L 1/00* (2006.01)
(52) U.S. Cl. .............................. 123/406.41; 123/90.15; 123/435; 123/568.16
(58) Field of Classification Search ................. 123/295, 123/305, 396, 568.16, 568.22, 568.24, 436, 123/90.15, 434, 435, 406.41–406.43
See application file for complete search history.

(56) References Cited

U.S. PATENT DOCUMENTS

| 4,524,745 | A | * | 6/1985 | Tominari et al. | ............ 123/478 |
| 5,140,850 | A | | 8/1992 | Ellmann et al. | |
| 5,590,632 | A | * | 1/1997 | Kato et al. | ................... 123/480 |
| 6,745,743 | B2 | * | 6/2004 | Abo et al. | .................... 123/295 |
| 7,066,160 | B2 | * | 6/2006 | Matsumoto | ............ 123/568.16 |
| 7,628,013 | B2 | * | 12/2009 | Aikawa et al. | ................ 60/324 |

(Continued)

FOREIGN PATENT DOCUMENTS

EP    1 566 533 A1    8/2005

(Continued)

*Primary Examiner*—John T Kwon
(74) *Attorney, Agent, or Firm*—Oliff & Berridge, PLC

(57) ABSTRACT

The internal combustion engine has a valve driving mechanism (VM) capable of changing the valve-opening characteristic of at least one of an intake valve (Vi) and an exhaust valve (Ve), an in-cylinder pressure sensor for detecting the in-cylinder pressure in a combustion chamber and ECU. ECU calculates the variation amount of the in-cylinder pressure caused by the valve-overlap of the intake valve (Vi) and the exhaust valve (Ve), and based on this variation amount of the in-cylinder pressure and the in-cylinder pressure detected at a predetermined timing in the compression stroke, calculates an amount of air sucked in the combustion chamber, as well as, based on this calculated intake air amount, determines the ignition timing. The amount of air sucked in the combustion chamber is accurately and costlessly calculated, and the ignition timing is optimally determined by using the calculated air amount.

9 Claims, 13 Drawing Sheets

U.S. PATENT DOCUMENTS

| | | | |
|---|---|---|---|
| 2003/0121495 A1* | 7/2003 | Abo et al. | 123/295 |
| 2004/0139949 A1 | 7/2004 | Koseki et al. | |
| 2004/0244473 A1* | 12/2004 | Tamura et al. | 73/118.1 |
| 2005/0199216 A1* | 9/2005 | Matsumoto | 123/396 |

FOREIGN PATENT DOCUMENTS

| | | |
|---|---|---|
| FR | 2 847 619 A1 | 5/2004 |
| GB | 2 284 895 A | 6/1995 |
| JP | A-58-217734 | 12/1983 |
| JP | A-62-63172 | 3/1987 |
| JP | A-62-228642 | 10/1987 |
| JP | A 02-040054 | 2/1990 |
| JP | A-2001-263119 | 9/2001 |
| JP | A-2002-54467 | 2/2002 |
| JP | A-2002-138893 | 5/2002 |
| JP | A 2004-108262 | 4/2004 |
| WO | WO 90/15236 A1 | 12/1990 |
| WO | WO 2006/015929 A1 | 2/2006 |

* cited by examiner

DEVICE AND METHOD FOR CONTROLLING INTERNAL COMBUSTION ENGINE

TECHNICAL FIELD

The present invention relates to a device and a method for controlling an internal combustion engine generating power by burning gaseous mixture of fuel and air in the interior of a combustion chamber, particularly to a device and a method for controlling an internal combustion engine having a valve-driving mechanism capable of changing a valve-opening characteristic of at least one of an intake valve and an exhaust valve.

BACKGROUND ART

Generally, an ignition timing of a spark ignition type internal combustion engine is approximately determined based on an amount of air sucked into a cylinder combustion chamber (intake air amount) and a rotational speed of the internal combustion engine. While, the intake air amount is determined based on a value detected by an airflow meter provided on the upstream side of an intake path.

The intake air amount determined based on the value detected by the airflow meter is sometimes inaccurate and may include an error relative to an actual intake amount sucked into the in-cylinder combustion chamber. That is, the airflow meter is located at a position upstream from the in-cylinder combustion chamber, and if used for an automobile, the internal combustion engine is often in a non-steady state or a transition state rather than in a steady state. Accordingly, there is a time lag between an instant at which air passes the airflow meter and an instant at which it enters the in-cylinder combustion chamber, and in this time interval, it is not rare that the operating state of the internal combustion engine has varied. Therefore, measured value of intake air amount obtained from the airflow meter does not always coincide with the actual air amount sucked in the cylinder combustion chamber. Also, if the internal combustion engine is of a multi-cylinder type, the airflow meter measures the intake air amount at a collecting point before distributing the intake air into the respective cylinders, whereby such a measured value does not always reflect the intake air amount actually sucked into the respective one cylinder. Further, the variation between the respective cylinders caused by the manufacturing error or others may be one factor of the measurement error of the intake air amount.

Since the intake air amount measured by the airflow meter contains the error in such a manner, the ignition timing determined based thereon does not always become an optimum one.

On one hand, a technique for estimating the intake air amount within the in-cylinder combustion chamber not relied on the airflow meter has been proposed in the prior art. For example, in Japanese Patent Application Laid-open No. 2-040054 (1990), a device for controlling an internal combustion engine is disclosed, including means for calculating the variation of the in-cylinder pressure between a timing directly after the opening of an intake valve and a timing directly before the ignition based on the in-cylinder pressure, the crank angle and the opening degree of a throttle and means for calculating the intake air amount from the variation of the in-cylinder pressure and the engine rotational speed.

On the other hand, for improving the output or the efficiency as well as reducing the emission, there has been known an internal combustion engine capable of setting a valve-overlap for simultaneously opening the intake valve and the exhaust valve. In such kinds of internal combustion engines, one provided with a control device has been known, capable of calculating an amount of gas remaining in the combustion chamber (internal EGR amount) caused by the valve-overlap of the intake valve and the exhaust valve (for example, see Japanese Patent Application Laid-open No. 2004-108262). Since the amount of gas actually remaining in the combustion chamber is a sum of an amount of freshly sucked air and an amount of earlier remaining gas, the knowledge of the remaining gas amount is preferable for measuring an accurate amount of intake air (fresh air amount) and determining the optimum ignition timing.

The control device described in Japanese Patent Application Laid-open No. 2004-108262 calculates the in-cylinder temperature and the in-cylinder pressure as well as a gas constant based on signals issued from a discharge temperature sensor, an intake air pressure sensor and a discharge pressure sensor, and calculates an amount of gas in the cylinder at the closing of the exhaust valve based on these in-cylinder temperature, in-cylinder pressure and gas constant. Further, this control device calculates an amount of blowback gas during the overlap of the intake valve and the exhaust valve based on signals issued from a crank angle sensor, a water temperature sensor, a cam angle sensor and an accelerator opening degree sensor, and calculates an amount of gas remaining in the combustion chamber (internal EGR amount) caused by the valve overlap, based on these in-cylinder gas amount and the blowback gas amount.

As described above, according to the conventional control device, it is possible to calculate the amount of intake air in the internal combustion engine and the amount of remaining gas (internal EGR amount) when the valve overlap is set. However, in the above-mentioned prior art, a number of parameters are required for calculating the amount of intake air or the amount of remaining gas. Accordingly, in the conventional internal combustion engine, many sensors are necessary for obtaining these parameters to result in the increase in production cost.

DISCLOSURE OF THE INVENTION

An object of the present invention is to provide a device and a method for controlling an internal combustion engine capable of accurately and costlessly calculating an amount of air sucked in a combustion chamber as well as optimally determining ignition timing while using the calculated air amount.

To achieve the above object, according to a first aspect of the present invention, a device for controlling an internal combustion engine, having a valve driving mechanism capable of varying the valve-opening characteristic in at least one of an intake valve and an exhaust valve so that the mixture of fuel and air is burnt in the interior of a combustion chamber to generate power is characterized by comprising in-cylinder pressure detection means for detecting an in-cylinder pressure within the combustion chamber, in-cylinder pressure variation amount calculation means for calculating a variation amount of the in-cylinder pressure due to the valve-overlap of the intake valve and the exhaust valve, intake air amount calculation means for calculating an amount of air sucked in the combustion chamber based on the in-cylinder pressure detected by the in-cylinder pressure detection means at a predetermined timing and the variation amount of the in-cylinder pressure calculated by the in-cylinder pressure variation amount calculation means, ignition means for igniting the gaseous mixture in the combustion chamber, and ignition timing control means for determining the ignition timing by the ignition means based on the intake air amount calculated by the intake air amount calculation means.

According to a second aspect of the present invention, in the first aspect of the present invention, the ignition timing control means determines a basic ignition timing based on an intake air amount detected by an airflow meter or an intake air amount estimated based on an opening degree of a throttle valve and an engine rotational speed, determines a ratio of remaining gas in the combustion chamber based on an intake air amount calculated by the intake air amount calculation means, determines an ignition timing correction amount based on the ratio of the remaining gas, and corrects the basic ignition timing based on the ignition timing correction amount to determine the ignition timing.

According to a third aspect of the present invention, in the first or second aspect of the present invention, the predetermined timing is changed in accordance with the operating state of the internal combustion engine.

According to a fourth aspect of the present invention, in the third aspect of the present invention, the predetermined timing is changed in accordance with the engine rotational speed.

According to a fifth aspect of the present invention, in the second aspect of the present invention, the predetermined timing is changed in accordance with the basic ignition timing in the second aspect.

According to a sixth aspect of the present invention, in the second aspect of the present invention, the ignition timing control means does not execute the correction of the basic ignition timing but determines the basic ignition timing as the ignition timing when the engine rotational speed exceeds the predetermined speed.

According to a seventh aspect of the present invention, in the first aspect of the present invention, intake air amount control means is further provided in the first aspect for controlling the intake air amount so that a torque output from the internal combustion engine coincides with a target torque determined based on an opening degree of an accelerator, and the ignition timing control means determines a basic ignition timing based on an intake air amount detected from an airflow meter or an intake air amount estimated based on an opening degree of a throttle valve and an engine rotational speed, estimates an output torque from the internal combustion engine based on the intake air amount calculated by the intake air amount calculation means, determines an ignition timing correction amount based on the estimated output torque and the target torque, and corrects the basic ignition timing based on the ignition timing correction amount to determine the ignition timing.

According to an eighth aspect of the present invention, in either one of the first to seventh aspects, the internal combustion engine has a plurality of combustion chambers, each having the in-cylinder pressure detection means, wherein the in-cylinder pressure variation amount calculation means calculates the in-cylinder pressure variation amount in the respective combustion chamber, wherein the intake air amount calculation means calculates an amount of air sucked into the respective combustion chamber based on the in-cylinder pressure of the respective combustion chamber detected by the respective in-cylinder pressure detection means and the in-cylinder pressure variation amount in the respective combustion chamber calculated by the in-cylinder pressure variation calculation means, wherein the ignition means is provided in the respective combustion chamber, and the ignition timing control means determines an ignition timing of the ignition means in the respective combustion chamber based on the intake air amount in the respective combustion chamber calculated by the intake air amount calculation means.

According to a ninth aspect of the present invention, a method for controlling an internal combustion engine having a valve driving mechanism capable of varying the valve-opening characteristic in at least one of an intake valve and an exhaust valve so that the mixture of fuel and air is burnt in the interior of a combustion chamber to generate power is characterized by a step (a) for determining a basic ignition timing based on an intake air amount detected by an airflow meter or an intake air amount estimated based on an opening degree of a throttle valve and an engine rotational speed, a step (b) for calculating an in-cylinder pressure variation amount caused by the valve-overlap of the intake valve and the exhaust valve and calculating an amount of air sucked into the combustion chamber based on the in-cylinder pressure variation amount and the in-cylinder pressure in the combustion chamber detected at a predetermined timing, and a step (c) for determining a ratio of remaining gas in the combustion chamber based on the calculated intake air amount, determining an ignition timing correction amount based on the ratio of the remaining gas and determining an ignition timing by correcting the basic ignition timing based on the ignition timing correction amount.

According to the present invention, it is possible to realize a device and a method for controlling an internal combustion engine capable of accurately and costlessly calculating the intake air amount sucked in the combustion chamber at a low cost as well as optimally determining the ignition timing by using the calculated air amount.

BEST MODE FOR CARRYING OUT THE INVENTION

Figure 6:
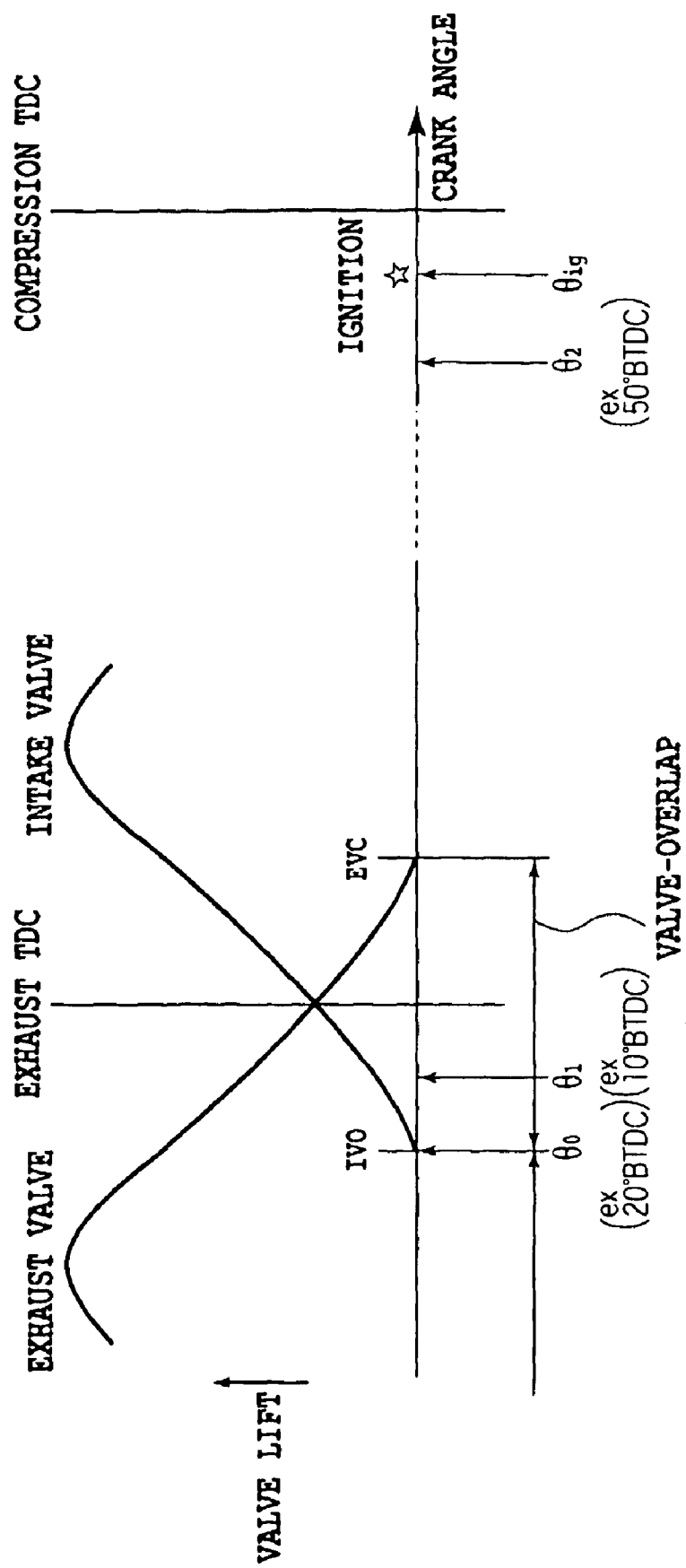
FIG. 6 is an example of a timing chart representing the timing for executing the respective processing in the control device in this aspect.

The inventive device for controlling an internal combustion engine is adapted to calculate an amount of variation of in-cylinder pressure when the valve-overlap of an intake valve and an exhaust valve is set, caused by the valve-overlap, and based on this in-cylinder pressure variation amount and an in-cylinder pressure detected by an in-cylinder pressure detection means at a predetermined timing. In this regard, FIG. 6 representing the respective timing described below should be suitably referred to.

Here, in the case that an overlap between intake and exhaust valves is set, an amount of gas remaining in the combustion chamber Me caused by the valve-overlap is represented by the following formula (1), where an intake air pressure at a predetermined timing during the valve-overlap (a timing at which a crank angle becomes $\theta 1$) is $Pm(\theta 1)$, an exhaust gas pressure at this predetermined timing is $Pe(\theta 1)$, an exhaust gas temperature at that time is Te and a gas constant is $R(J/(kg \cdot K))$.

$$Me = S \cdot \phi(Pm(\theta_1)/Pe(\theta_1)) \cdot Pe(\theta_1)/\sqrt{R \cdot Te} \quad (1)$$

In the above formula (1), S denotes a gas-passage effective area for allowing gas to pass during the valve-overlap. Such a gas-passage effective area S is represented by the following formula (2). In the formula (2), $Ne(\theta 1)$ denotes engine revolutions (per one minute; substantially corresponds to an engine rotational speed) at a timing wherein the crank angle is $\theta 1$. Also, Ri denotes a diameter of an intake valve Vi; Re denotes a diameter of an exhaust valve Ve; $Li(\theta 1)$ denotes a lift amount of the intake valve Vi; Le denotes a lift amount of the exhaust valve Ve; IVO denotes a crank angle at a timing for opening the intake valve Vi; and EVC denotes a crank angle at a timing for closing the exhaust valve Ve. Further, in the formula (2), a value $(\int v(Li(\theta \cdot Le(\theta))d\theta)$ obtained by integrating $v(Li(\theta \cdot Le(\theta))$ from IVO to EVC is a value determined in accordance with an advance amount by a variable valve timing mechanism (VVT advance amount).

Also, in the above formula (1), $f(Pm(\theta 1)/Pe(\theta 1))$ is a term relating to a ratio of the intake air pressure relative to the exhaust gas pressure, represented basically by the following formula (3), wherein when a value of $Pm(\theta 1)/Pe(\theta 1)$ is small, it is represented by the following formula (4). In this regard, in the formulas (3) and (4), $\kappa$ denotes a specific heat ratio.

$$S = \pi \cdot \sqrt{Ri \cdot Re} \cdot \cos(45°) \cdot \int_{IVO}^{EVC} \sqrt{Li(\theta) \cdot Le(\theta)} \, d\theta \cdot (60/Ne(\theta_1)/360) \quad (2)$$

$$\text{If } \frac{Pm(\theta_1)}{Pe(\theta_1)} \geq \left(\frac{2}{\kappa+1}\right)^{\frac{\kappa}{\kappa-1}}, \quad (3)$$

$$\text{then } \phi\left(\frac{Pm(\theta_1)}{Pe(\theta_1)}\right) = \sqrt{\frac{2\kappa}{\kappa-1} \cdot \left\{\left(\frac{Pm(\theta_1)}{Pe(\theta_1)}\right)^{\frac{2}{\kappa}} - \left(\frac{Pm(\theta_1)}{Pe(\theta_1)}\right)^{\frac{\kappa+1}{\kappa}}\right\}}$$

$$\text{If } \frac{Pm(\theta_1)}{Pe(\theta_1)} < \left(\frac{2}{\kappa+1}\right)^{\frac{\kappa}{\kappa-1}}, \quad (4)$$

$$\text{then } \phi\left(\frac{Pm(\theta_1)}{Pe(\theta_1)}\right) = \sqrt{\kappa \cdot \left(\frac{2\kappa}{\kappa+1}\right)^{\frac{\kappa+1}{\kappa-1}}}$$

On the other hand, the relationship between an amount Me of gas remaining in the combustion chamber caused by the valve-overlap and a variation amount $\Delta Pc$ of the in-cylinder pressure due to the valve-overlap is represented by the following formula (5). Thereby, from the above formulas (1) and (5), the in-cylinder pressure variation amount $\Delta Pc$ is represented by the following formula (6) based on an amount Me of gas remaining in the combustion chamber caused by the valve-overlap. In this regard, in the formula (6), a denotes a constant determined based on experiments or others. Since it has been experimentally found that the temperature term $Te/vTe$ in the formula (5) is assumed as a constant, the temperature term is contained in a. From the in-cylinder pressure variation amount $\Delta Pc$ and the in-cylinder pressure $Pc(\theta 2)$ detected by the in-cylinder pressure detecting means at a predetermined timing during the compression stroke (a timing at which the crank angle is $\theta 2$, before the combustion-starting timing (ignition timing) $\theta$ig and after the intake valve has closed), an amount Mair of air sucked into the combustion chamber is represented by the following formula (7). In this regard, in the formula (7), $\beta$ denotes a constant determined based on experiments or others.

$$\Delta Pc \propto Me \cdot Te = S \cdot \phi(Pm(\theta_1)/Pe(\theta_1)) \cdot Pe(\theta_1) \cdot Te/\sqrt{R \cdot Te} \propto S \cdot \phi(Pm(\theta_1)/Pe(\theta_1)) \cdot Pe(\theta_1) \quad (5)$$

$$\Delta Pc = \alpha \cdot S \cdot \phi(Pm(\theta_1)/Pe(\theta_1)) \cdot Pe(\theta_1) \quad (6)$$

$$M_{air} = \beta \cdot (Pc(\theta_2) - \Delta Pc) \quad (7)$$

Accordingly, it is possible to accurately and costlessly calculate the amount of air sucked in the combustion chamber without using many sensors, obtaining the pressure $Pm(\theta 1)$ of the intake air and the engine revolutions $Ne(\theta 1)$ at the predetermined timing during the valve-overlap and the in-cylinder pressure $Pc(\theta 2)$ detected at the predetermined timing, as carried out in the device for controlling the internal combustion engine according to the present invention.

Also, as described above, when the in-cylinder pressure variation amount $\Delta Pc$ due to the valve-overlap is calculated based on the intake air pressure $Pm(\theta 1)$ and the exhaust gas pressure $Pe(\theta 1)$ during the valve-overlap, the exhaust gas pressure $Pe(\theta 1)$ is preferably estimated based on the in-cylinder pressure $Pc(\theta 0)$ detected by in-cylinder pressure detection means directly before or at the beginning of the valve-overlap (at the timing at which the crank angle becomes $\theta 0$).

That is, the exhaust gas pressure before the intake valve is open for valve-overlap or at the opening of the intake valve approximately coincides with the in-cylinder pressure, and if a load of the internal combustion engine is not so large, the pressure variation between before and after the opening of the intake valve is small. Accordingly, it is possible to estimate the exhaust gas pressure $Pe(\theta 1)$ during the valve-overlap based on the in-cylinder pressure $Pc(\theta 0)$ detected by the in-cylinder pressure detection means directly before or just at the beginning of the valve-overlap, and if the internal combustion engine is loaded at a low level, the following relationship $Pe(\theta 1) = Pc(\theta 0)$ is realized. Thus, since the sensor for detecting the exhaust gas pressure is unnecessary, it is possible to reduce the cost necessary for calculating the amount of air sucked in the combustion chamber.

On the other hand, when the load of the internal combustion engine becomes larger to some extent, the pressure variation of the exhaust gas increases during the valve-overlap under the influence of exhaust pulsation or others, whereby it is difficult to use the in-cylinder pressure $Pc(\theta 0)$ detected by the in-cylinder pressure detection means directly before or just at the beginning of the valve-overlap, instead of the exhaust gas pressure $Pe(\theta 1)$ during the valve-overlap.

That is, until the load of the internal combustion engine becomes higher to some extent, the ratio of the intake air pressure $Pm(\theta 1)$ relative to the exhaust gas pressure $Pe(\theta 1)$ during the valve-overlap substituted in the function f in the formula (3) approximately coincides with the ratio of the intake air pressure $Pm(\theta 1)$ during the valve-overlap relative to the in-cylinder pressure $Pc(\theta 0)$ directly before or at the beginning of the valve-overlap, both of which ratios become larger as the load increases. Contrarily, if the ratio of the intake air pressure $Pm(\theta 1)$ relative to the in-cylinder pressure $Pc(\theta 0)$ exceeds a predetermined value e defined experimentally or based on experience, the relationship represented by the formula $Pm(\theta 1)/Pe(\theta 1)=Pm(\theta 1)/Pc(\theta 0)$ is not established.

Accordingly, when the ratio of the intake air pressure $Pm(\theta 1)$ relative to the in-cylinder pressure $Pc(\theta 0)$ exceeds the predetermined value e, the assumption is first made that the ratio of the intake air pressure $Pm(\theta 1)$ relative to the exhaust gas pressure $Pe(\theta 1)$ during the valve-overlap is fixed to the predetermined value e, and then the exhaust gas pressure $Pe(\theta 0)$ during the valve-overlap is preferably defined by the following formula based on the intake air pressure $Pm(\theta 1)$ during the valve-overlap and the predetermined value e: $Pe(\theta 1)=Pm(\theta 1)/e$. Thereby, even if the load of the internal combustion engine increases when the exhaust gas pressure during the valve-overlap is not actually measured, it is possible to accurately calculate the amount of air sucked in the combustion chamber, without being influenced by the pressure variation of the exhaust gas accompanied with the valve-overlap.

In the internal combustion engine of a multi-cylinder type, in-cylinder pressure detection means is preferably provided in the respective combustion chamber. Preferably, in such a case, the variation amount $\Delta Pc$ of the in-cylinder pressure is calculated for the respective combustion chamber, and an amount of air sucked into the respective combustion chamber is preferably calculated based on this variation amount $\Delta Pc$ in the respective combustion chamber and the in-cylinder pressure $Pc(\theta 2)$ in the respective combustion chamber detected by the respective in-cylinder pressure detection means at a predetermined timing. Thereby, since it is possible to accurately know the variation of the intake air amounts between the combustion chambers, the accuracy of the control of air-fuel ratio etc in the respective combustion chamber is improved.

Also, the intake air pressure in either of the combustion chambers during the valve-overlap may be estimated based on the in-cylinder pressure at the bottom dead center of the combustion chamber in which the intake stroke is executed prior to said combustion chamber.

Generally, the intake air pressure and the in-cylinder pressure are approximately equal to each other at the bottom dead center of the intake stroke. Also, the timing at which the valve-overlap is executed in a certain combustion chamber approximately coincides with the timing at which the bottom dead center of the intake stroke reaches in another combustion chamber in which the intake stroke is carried out prior to the former combustion chamber by 1/N cycle (in this regard, intake, compression, expansion and exhaust strokes constitutes one cycle, and N represents the number of cylinders). Accordingly, by estimating the intake air pressure based on the in-cylinder pressure while taking such matters into account, no sensors are required for detecting the intake air pressure, whereby it is possible to further reduce the cost necessary for the calculation of the amount of air sucked in the respective combustion chamber.

Next, the best modes for carrying out the present invention will be concretely described below.

Figure 1:
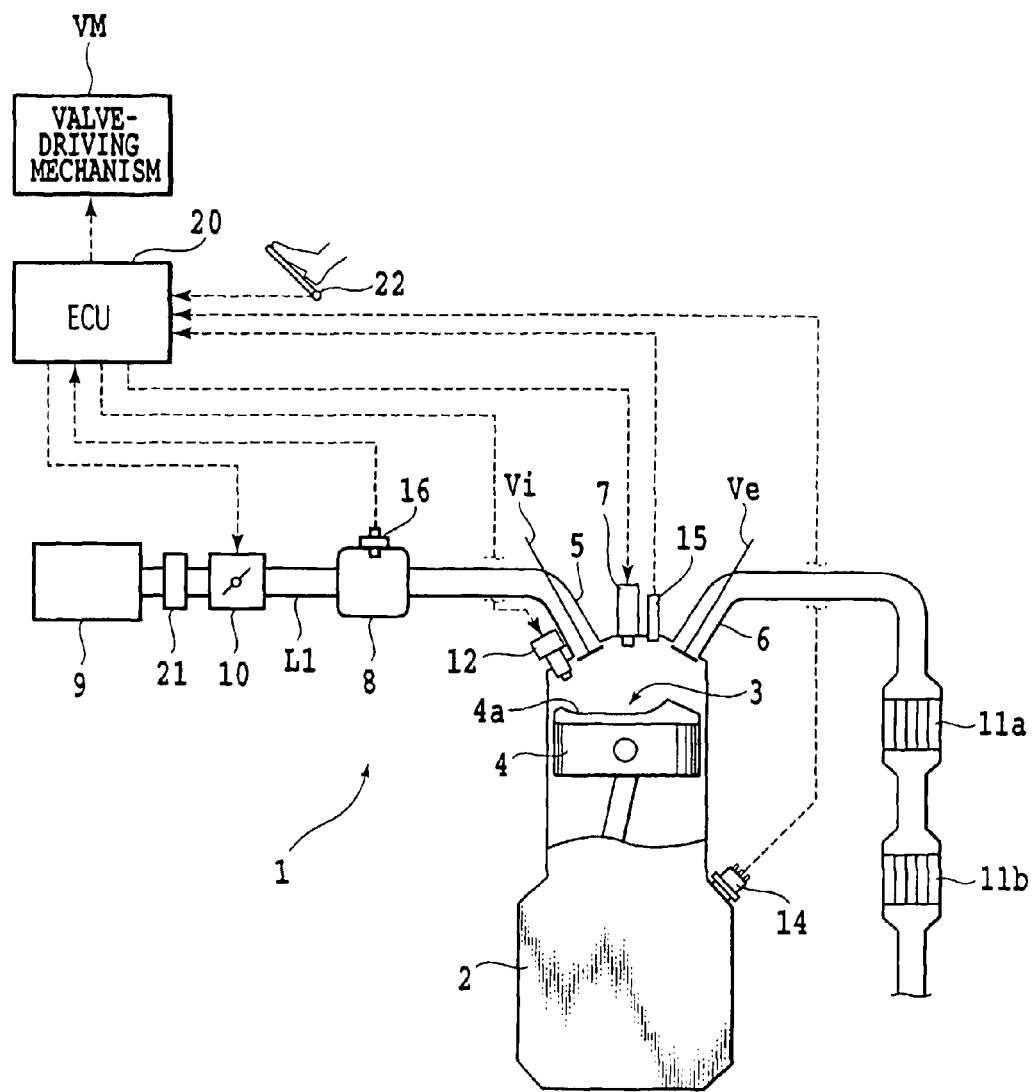
FIG. 1 is a schematic illustration of an internal combustion engine to which the control device according to the present invention is applied.

FIG. 1 is a schematic illustration of an internal combustion engine to which the inventive control device is applied. An internal combustion engine 1 shown in this drawing is structured to generate power by burning gaseous mixture of fuel and air in the interior of a combustion chamber 3 formed in a cylinder bock 2 and reciprocating a piston 4 within the combustion chamber 3. The internal combustion engine 1 is preferably of a multi-cylinder type, and the internal combustion engine 1 according to this embodiment is constituted as a four-cylinder type engine for an automobile.

An intake port of the respective combustion chamber 3 is connected to an intake pipe (intake manifold) 5, and an exhaust port of the respective combustion chamber 3 is connected to an exhaust pipe (exhaust manifold) 6. Also, in a cylinder head of the internal combustion engine 1, an intake valve Vi and an exhaust valve Ve are disposed in the respective combustion chamber 3. The respective intake valve Vi opens and closes the corresponding intake port, and the respective exhaust valve Ve opens and closes the corresponding exhaust port. The respective intake valve V1 and exhaust valve Ve are opened and closed by a valve-driving mechanism VM including a variable timing mechanism. Further, the internal combustion engine 1 has a plurality of ignition plugs 7 corresponding to the number of cylinders, wherein the ignition plug 7 is disposed in a cylinder head to be opposed to the interior of the corresponding combustion chamber.

As shown in FIG. 1, the intake pipe 5 is connected to a surge tank 8. An air-supply line L1 is connected to the surge tank 8, and further to an air-intake port not shown via an air cleaner 9. In the air-supply line L1 (at a position between the surge tank 8 and the air cleaner 9), a throttle valve (an electronic control type throttle valve in this embodiment) 10 is incorporated. In the air-supply line L1 on the upstream side of the throttle valve 10, an airflow meter 21 is provided as intake air amount detection means for detecting an amount of air sucked in the internal combustion engine. On the other hand, as shown in FIG. 1, a front stage catalytic device 11a containing, for example, three-way catalyst and a rear stage catalytic device 11b containing, for example, NOx-absorption reduction catalyst are connected to the exhaust pipe 6.

Further, the internal combustion engine 1 has a plurality of injectors 12, each being arranged to be opposite to the corresponding combustion chamber 3 as shown in FIG. 1. The respective piston 4 in the internal combustion engine 1 is formed to be of a so-called dish-shaped top type, having a recess 4a on the upper surface thereof. In the internal combustion engine 1, fuel such as gasoline is directly ejected from the respective injector 12 toward the recess 4a of the piston 4a in the respective combustion chamber 4 while sucking air in the respective combustion chamber 3.

Thereby, in the internal combustion engine 1, since a layer of the gaseous mixture of fuel and air is formed (laminated) in the vicinity of the ignition plug 7, while being separated from environmental air layer, it is possible to execute the stable lamination combustion using extremely rare gaseous mixture. In this regard, the internal combustion engine 1 in this embodiment is a so-called direct injection type engine. The invention should not be limited to this type engine, however, and is, of course, applicable to an internal combustion engine of an intake pipe (intake port)-injection type.

The above-mentioned ignition plug 7, throttle valve 10, the injector 12 and valve-driving mechanism Vm or others are electrically connected to an electrical control unit (referred to as ECU hereinafter) 20. ECU 20 includes CPU, ROM, RAM, input/output port and memory or others, all of which are not illustrated in the drawing. As shown in FIG. 1, various sensors are electrically connected to ECU 20, such as a crank angle sensor 14, a sensor 22 for detecting an accelerator-opening degree, a throttle-opening degree sensor incorporated in the throttle valve sensor 10 or others. ECU 20 controls the ignition plug 7, the throttle valve 10, the injector 12, the valve-driving mechanism or others so that a desired output is obtainable.

The internal combustion engine 1 has a plurality of in-cylinder pressure sensors (in-cylinder pressure detection means) 15 including semiconductor elements, piezoelectric elements, magnetic strain elements, optical fiber detection elements or others in correspondence to the number of cylinders. The respective in-cylinder pressure sensor 15 is disposed in the cylinder head so that the pressure-receiving surface is opposed to the interior of the corresponding combustion chamber 3, and electrically connected to ECU 20 via an A/D converter or others not shown. The in-cylinder pressure sensor 15 outputs a pressure applied to the pressure-receiving surface thereof in the combustion chamber 3 (in-cylinder pressure) as a value relative to the atmospheric pressure and provides a voltage signal (a signal representing the detected value) to ECU 20, which signal corresponds to the pressure (in-cylinder pressure) applied to the pressure-receiving surface in the combustion chamber.

Further, the internal combustion engine 1 has an intake air pressure sensor 16 for detecting the pressure of intake air (intake air pressure) in the surge tank 8 as an absolute pressure. Also, the intake air pressure sensor 16 is electrically connected via an A/D converter not shown or others to ECU 20 to provide a signal representing the detected absolute pressure of the intake air in the surge tank 8 to ECU 20. In this regard, values detected by the crank angle sensor 14 and the intake air pressure sensor 16 are sequentially provided to ECU 20 at a small time interval and stored in predetermined areas of ECU 20 (buffer) bit by bit. Also, values detected by the respective in-cylinder pressure sensor 15 (in-cylinder pressures) are stored in predetermined areas of ECU 20 (buffer) bit by bit after being corrected to the absolute pressure based on the value detected by the intake air pressure sensor 16.

Figure 2:
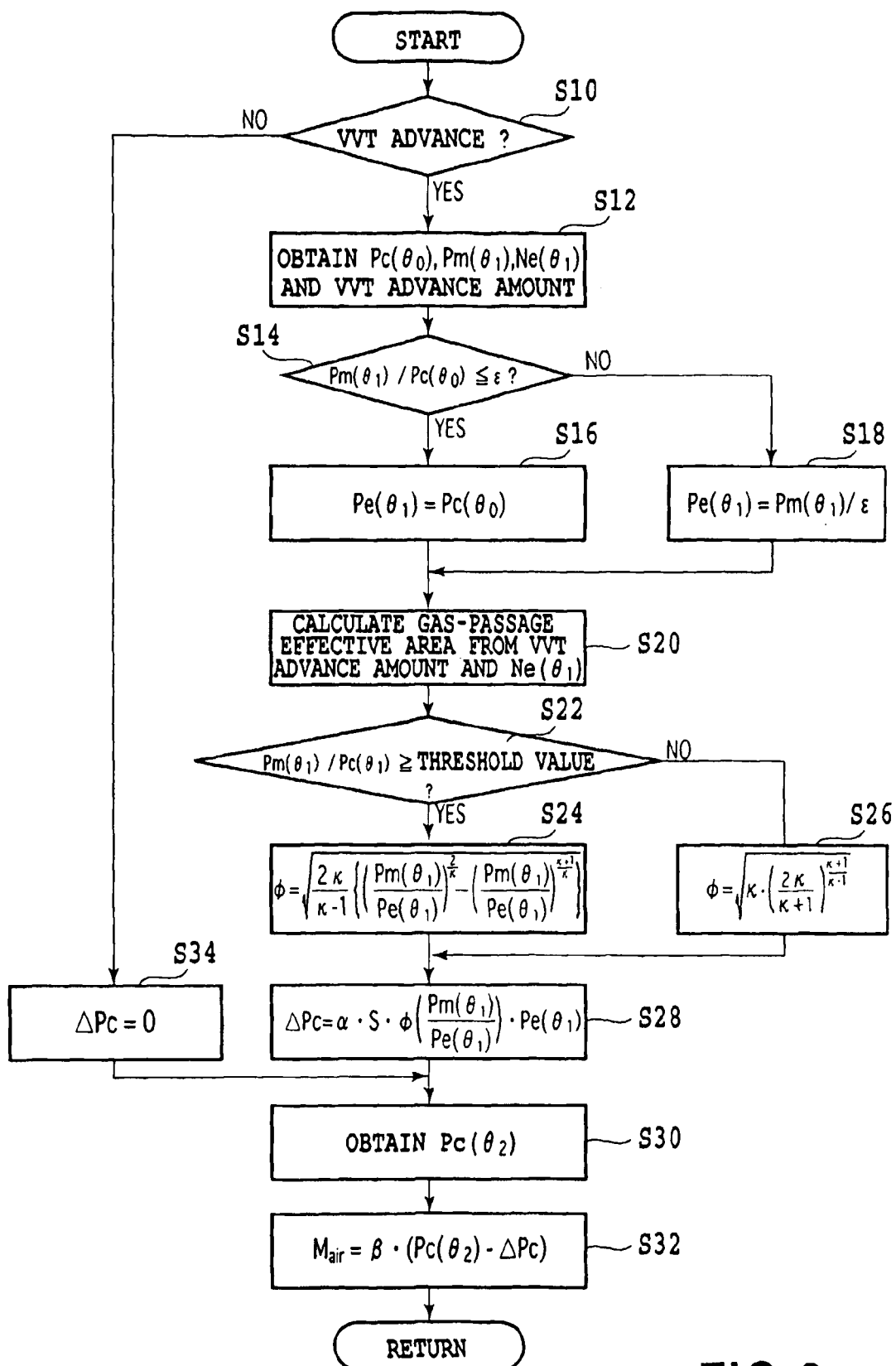
FIG. 2 is a flow chart for explaining an intake air amount calculation routine in the internal combustion engine shown in FIG. 1.

Next, a process will be explained with reference to FIG. 2, for calculating or estimating an amount of air sucked in the respective combustion chamber 3 of the above-mentioned internal combustion engine 1, without using the value detected by the airflow meter 21. When the internal combustion engine 1 is started, the intake air amount calculation routine shown in FIG. 2 is repeatedly executed by ECU 20 in the respective combustion chamber 3. The intake air amount calculation routine is constructed to calculate an amount of air sucked in the respective combustion chamber 3 basically using the above-mentioned formulas (1) to (7). At the timing for executing this routine, ECU 20 first determines whether or not the valve-opening timing of the intake valve Vi is advanced (at S10).

If ECU 20 determines that the valve-opening timing of the intake valve Vi is advanced at S10, ECU 20 reads from the predetermined memory area the in-cylinder pressure $Pc(\theta 0)$ of the aimed combustion chamber 3 detected by the in-cylinder pressure sensor 15 at a predetermined timing directly before the valve-overlap of the intake valve Vi and the exhaust valve Ve or when the beginning thereof (at the timing at which the crank angle becomes $\theta 0$) as well as reads the intake air pressure $Pm(\theta 1)$ detected by the intake air pressure sensor 16 at a predetermined timing during the valve-overlap of the intake valve Vi and the exhaust valve Ve (the timing at which the crank angle becomes $\theta 1$) (at S12). Also, at S12, ECU 20 determines the engine revolution $Ne(\theta 1)$ based on the value detected by the crank angle sensor 14 at the predetermined timing during the valve-overlap (the timing at which the crank angle becomes $\theta 1$), and obtains a VVT advance amount from the valve-driving mechanism VM at the timing at which the crank angle becomes $\theta 1$.

As shown in FIG. 6, in this embodiment, the predetermined timing directly before the valve-overlap of the intake valve Vi and the exhaust valve Ve or when the beginning thereof is a timing of the beginning of the valve-overlap; i.e., a timing when the intake valve Vi starts the opening; at which the crank angle is, for example, at $\theta 0 = 20°$ before the top dead center (20° BTDC in the exhaust stroke). Also, the predetermined timing during the valve-overlap is a timing at which the crank angle is, for example, $\theta 1 = 10°$ before the top dead center (10° BTDC in the exhaust stroke). After the in-cylinder pressure $Pc(\theta 0)$ at the timing when the crank angle becomes $\theta 0$ and the intake air pressure $Pm(\theta 1)$ at the timing when the crank angle becomes $\theta 1$ are obtained at S12, ECU 20 calculates a value of $Pm(\theta 1)/Pc(\theta 0)$ that is a ratio of the intake air pressure $Pm(\theta 1)$ relative to the in-cylinder pressure $Pm(\theta 0)$ as well as determines whether or not the value of $Pm(\theta 1)/Pc(\theta 0)$ is equal to or smaller than the predetermined threshold value e (in this embodiment, e=0.95) (at S14).

Figure 3:
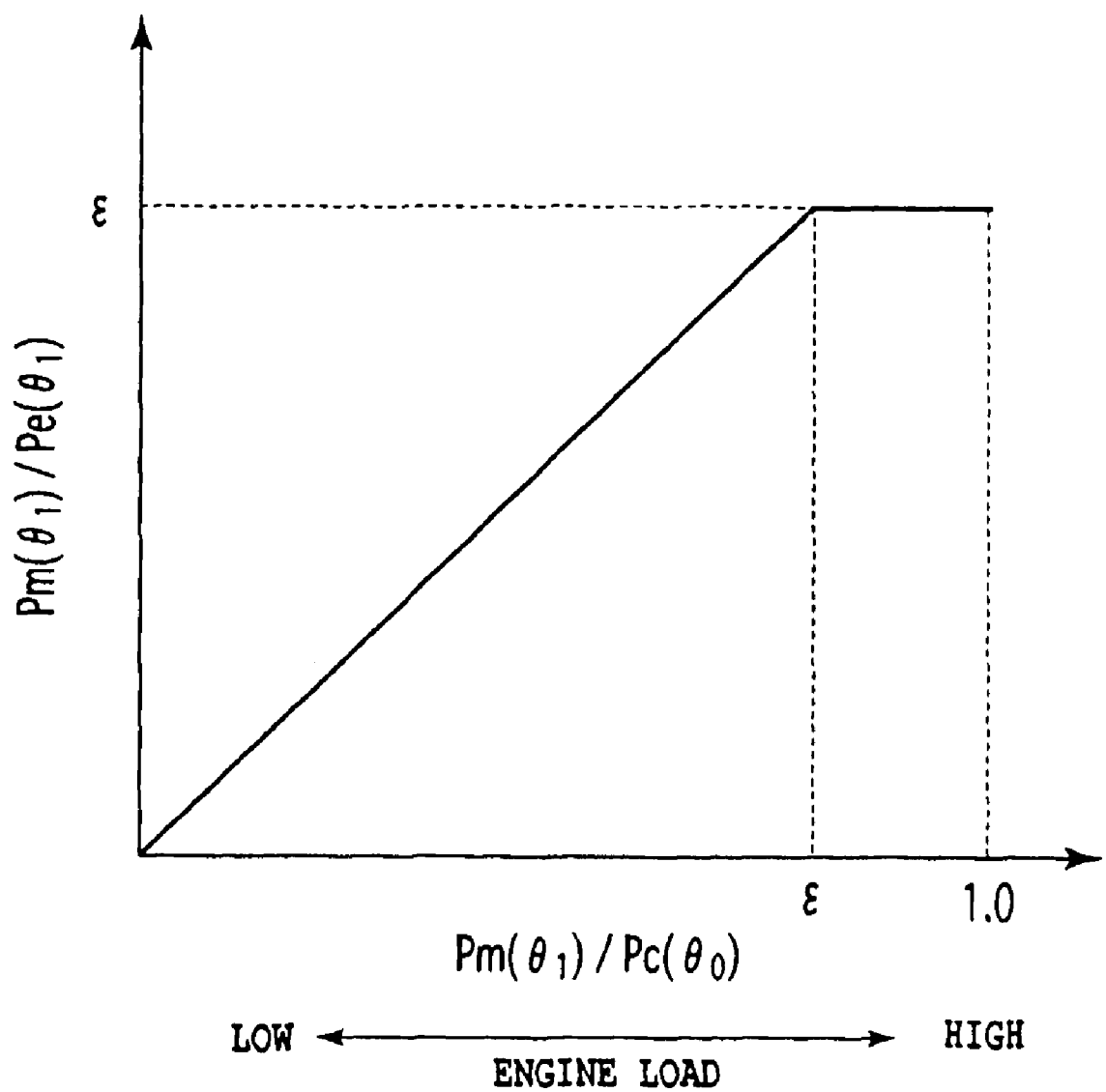
FIG. 3 is an example of a graph representing the relationship between a ratio of an intake air pressure at a predetermined timing during the valve-overlap relative to an in-cylinder pressure directly before or at the beginning of the valve-overlap and a ratio of a pressure of the intake air relative to a pressure of discharge gas at a predetermined timing during the valve-overlap.

Here, the relationship as shown in FIG. 3 exists between $Pm(\theta 1)/Pc(\theta 0)$ that is the ratio of the intake air pressure $Pm(\theta 1)$ relative to the in-cylinder pressure $Pc(\theta 0)$ and $Pm(\theta 1)/Pe(\theta 1)$ that is the ratio of the intake air pressure $Pm(\theta 1)$ relative to the exhaust gas pressure $Pe(\theta 1)$ used as a parameter in the above-mentioned formula (3). That is, in a range such that the load of the internal combustion engine 1 is not so large, the values $Pm(\theta 1)/Pe(\theta 0)$ and $Pm(\theta 1)/Pc(\theta 0)$ increase, respectively, as the load becomes higher to result in the relationship of $Pm(\theta 1)/Pe(\theta 0) = Pm(\theta 1)/Pc(\theta 0)$.

Namely, at the timing directly before the opening of the intake valve Vi for the purpose of the valve-overlap or of the opening of the valve, the exhaust gas pressure and the in-cylinder pressure approximately coincide with each other, and if the load of the internal combustion engine 1 is not so large, the pressure variation of the exhaust gas is small between before and after the intake valve Vi is opened for the purpose of valve-overlap. Accordingly, in a range such that the load of the internal combustion engine 1 is not so large, it is possible to assume the exhaust gas pressure $Pe(\theta 1)$ during the valve-overlap, i.e., at the timing when the crank angle is $\theta 1$, based on the in-cylinder pressure $Pc(\theta 0)$ detected by the in-cylinder pressure sensor 15 directly before or at the beginning of the valve-overlap, that is, at the timing at which the crank angle is $\theta 0$, thereby the estimation is possible that $Pe(\theta 1) = Pc(\theta 0)$ and $Pm(\theta 1)/Pe(\theta 0) = Pm(\theta 1)/Pc(\theta 0)$.

Contrarily, when the load of the internal combustion engine 1 becomes larger to some extent, the pressure variation of the exhaust gas becomes large between before and after the opening of the intake valve Vi for the purpose of valve-overlap, due to the pulsation of the exhaust gas or others. That is, if the load of the internal combustion engine 1 becomes larger to some extent and the ratio $Pm(\theta 1)/Pc(\theta 0)$ of the intake air pressure $Pm(\theta 1)$ relative to the in-cylinder pressure $Pc(\theta 0)$ exceeds the predetermined value e, the relationship of $Pm(\theta 1)/Pe(\theta 1)=Pm(\theta 1)/Pc(\theta 0)$ is not realized, and it is difficult to substitute the in-cylinder pressure $Pc(\theta 0)$ detected directly before or at the beginning of the valve-overlap for the exhaust gas pressure $Pe(\theta 1)$ during the valve-overlap.

In view of these matters, if it is determined at S14 that the value of $Pm(\theta 1)/Pc(\theta 0)$ is equal to or smaller than the above-mentioned threshold value e in the respective combustion chamber, the in-cylinder pressure $Pc(\theta 0)$ detected by the in-cylinder pressure sensor 15 directly before or at the beginning of the valve-overlap is substituted for the exhaust gas pressure $Pe(\theta 1)$ during the valve-overlap, and set as $Pe(\theta 1)=Pc(\theta 0)$ by ECU 20 (at S16). Also, if it is determined at S14 that the value of $Pm(\theta 1)/Pc(\theta 0)$ in the respective combustion chamber 3 exceeds the threshold value e, ECU 20 determines the exhaust gas pressure $Pe(\theta 1)$ during the valve-overlap in accordance with the formula $Pe(\theta 1)=Pm(\theta 1)/e$ (at S18). That is, in the processing at S18, it is assumed that the ratio of the intake air pressure $Pm(\theta 1)$ relative to the exhaust gas pressure $Pe(\theta 1)$ during the valve-overlap is fixed to the threshold value e as a guard value (0.95 in this embodiment), and the exhaust gas pressure $Pe(\theta 1)$ during the valve-overlap is determined based on the intake air pressure $Pm(\theta 1)$ during the valve-overlap and the threshold value e.

If the processing at S16 or S18 is executed, ECU 20 determines a value of $\int v(Li(\theta) \cdot Le(\theta))d\theta$ corresponding to the VVT advance amount obtained at S12 using a predetermined function or a map, and calculates an effective gas-passage area S by using this value and the engine revolution $Ne(\theta 1)$ obtained at S12 (at S20). After obtaining the effective gas-passage area S, ECU 20 determines whether or not a value dividing intake air pressure $Pm(\theta 1)$ obtained at S12 by the exhaust gas pressure $Pe(\theta 1)$ during the valve-overlap set at S16 or S18 exceeds a threshold value $(2/(\kappa+1))\kappa/(\kappa-1)$ (at S22). According to this embodiment, as the threshold value $(2/(\kappa+1))\kappa/(\kappa-1)$, a constant obtained by using $\kappa=1.32$, for example, is employed.

As described above, the formula representing $\phi(Pm(\theta 1)/Pe(\theta 1))$ necessary when the variation amount $\Delta Pc$ of the in-cylinder pressure due to the valve-overlap is calculated varies in accordance with the value of $Pm(\theta 1)/Pe(\theta 1)$. Therefore, if it is determined at S22 that the value of $Pm(\theta 1)/Pe(\theta 1)$ exceeds the above-mentioned threshold value, ECU 20 calculates the value of $f(Pm(\theta 1)/Pe(\theta 1))$ by using the formula (4) (at S26).

After determining the gas effective passage area S at S20 and $Pm(\theta 1)/Pe(\theta 1)$ at S24 or S26, ECU 20 calculates the variation amount $\Delta Pc$ of the in-cylinder pressure in the aimed combustion chamber 3 caused by the valve-overlap (at S28). After the processing at S28, ECU 20 reads the in-cylinder pressure $Pc(\theta 2)$ in the aimed combustion chamber 3 detected by the in-cylinder pressure sensor 15 at the timing at which the crank angle in the compression stroke becomes $\theta 2$ (at S30). In this regard, in this embodiment, the predetermined timing in the compression stroke is a timing at which the crank angle $\theta 2$ is, for example, 50° before top dead center (BTDC 50° in the compression stroke).

ECU 20 calculates the intake air amount Mair in the aimed combustion chamber 3 from the in-cylinder pressure variation amount obtained at S28 and the in-cylinder pressure $Pc(\theta 2)$ obtained at S30, by using the above-mentioned formula (7) (at S32). In such a manner, in the internal combustion engine 1, it is possible to accurately the amount of air sucked in the respective combustion chamber 3 at a low cost without using a number of sensors, by obtaining the intake air pressure $Pm(\theta 1)$, the exhaust gas pressure $Pe(\theta 1)$ and the engine revolution $Ne(\theta 1)$ at the predetermined timing during the valve-overlap, and the in-cylinder pressure $Pc(\theta 2)$ detected at the predetermined timing.

Also, in the internal combustion engine 1, if the load is relatively low and it is determined that the value of $Pm(\theta 1)/Pc(\theta 0)$ is smaller than the threshold value e, the in-cylinder pressure $Pc(\theta 0)$ detected by the in-cylinder pressure sensor 15 directly before or at the beginning of the valve-overlap is substituted for the exhaust gas pressure $Pe(\theta 1)$ during the valve-overlap. Thereby, since the sensor for actually measuring the exhaust gas pressure is unnecessary, it is possible to reduce the cost required for calculating the amount of air sucked in the respective combustion chamber 3.

In the internal combustion engine 1 having no sensor for actually measuring the exhaust gas pressure, if it is determined that the value of $Pm(\theta 1)/Pc(\theta 0)$ exceeds the threshold value e at S14 as a result of the increase in load, the exhaust gas pressure $Pe(\theta 1)$ during the valve-overlap is determined based on the threshold value e (at S18) under the assumption that the ratio of intake air pressure $Pm(\theta 1)$ relative to the exhaust gas pressure $Pe(\theta 1)$ during the valve-overlap is fixed as a so-called guard value to the threshold value e (0.95 in this embodiment). As described above, since the difference between the intake air pressure and the exhaust gas pressure becomes small and the remaining gas itself is little when the load of the internal combustion engine 1 becomes high, it is possible to accurately calculate the amount of air sucked in the respective combustion chamber 3 without being influenced by the variation of exhaust gas pressure even if the processing defined by S18 is executed; that is, the practically favorable result is obtainable.

Further, in the internal combustion engine 1 having a plurality of combustion chambers 3 and in-cylinder pressure sensors 15 provided in the respective combustion chambers 3, the in-cylinder pressure variation amount $\Delta Pc$ in the respective combustion chamber 3 is calculated, and based on this in-cylinder pressure variation amount $\Delta Pc$ in the respective combustion chamber 3 and the in-cylinder pressure $Pc(\theta 2)$ in the respective combustion chamber 3 detected by the respective in-cylinder pressure sensor 15, the amount of air sucked in the respective combustion chamber 3 is calculated. Thereby, it is possible to accurately know the variation of the intake air amount between the respective combustion chambers 3 and improve the accuracy of the fuel-air ratio control or others in the respective combustion engine 3.

On the other hand, if it is determined at S10 that the opening timing of the intake valve Vi does not advance whereby there is no valve-overlap between the intake valve Vi and the exhaust valve Ve, ECU 20 sets the in-cylinder pressure variation amount $\Delta Pc$ to be used at S2 to zero (at S34). Thereby, when the valve-overlap is not set, the amount of air Mair sucked in the respective combustion chamber 3 is calculated at S32 solely based on the in-cylinder pressure $Pc(\theta 2)$ obtained at S30. Here, the in-cylinder pressure during the compression stroke exhibits a relatively high value, and is accurately detectable irrespective of the detection accuracy of the in-cylinder pressure sensor 15 or the resolution power of the in-cylinder pressure data. Accordingly, if the in-cylinder pressure in the combustion chamber 3 at a predetermined timing during the compression stroke is used, it is possible to accurately obtain the amount of air sucked in the combustion chamber 3.

In the above-mentioned internal combustion chamber 1, if the answer is, negative at S14, it is assumed that the ratio of the intake air pressure $Pm(\theta 1)$ relative to the exhaust gas pressure $Pe(\theta 1)$ during the valve-overlap is fixed to the threshold value e as a guard value. However, this is not limitative. That is, as shown in FIG. 4, the relationship between Pm(θ1)/Pc(θ0) which is the ratio of the intake air pressure Pm(θ1) relative to the in-cylinder pressure Pc(θ0) and Pm(θ1)/Pe(θ1) which is the ratio of the intake air pressure Pm(θ1) relative to the exhaust gas pressure Pe(θ1) may be approximated while using a plurality of functions.

Figure 4:
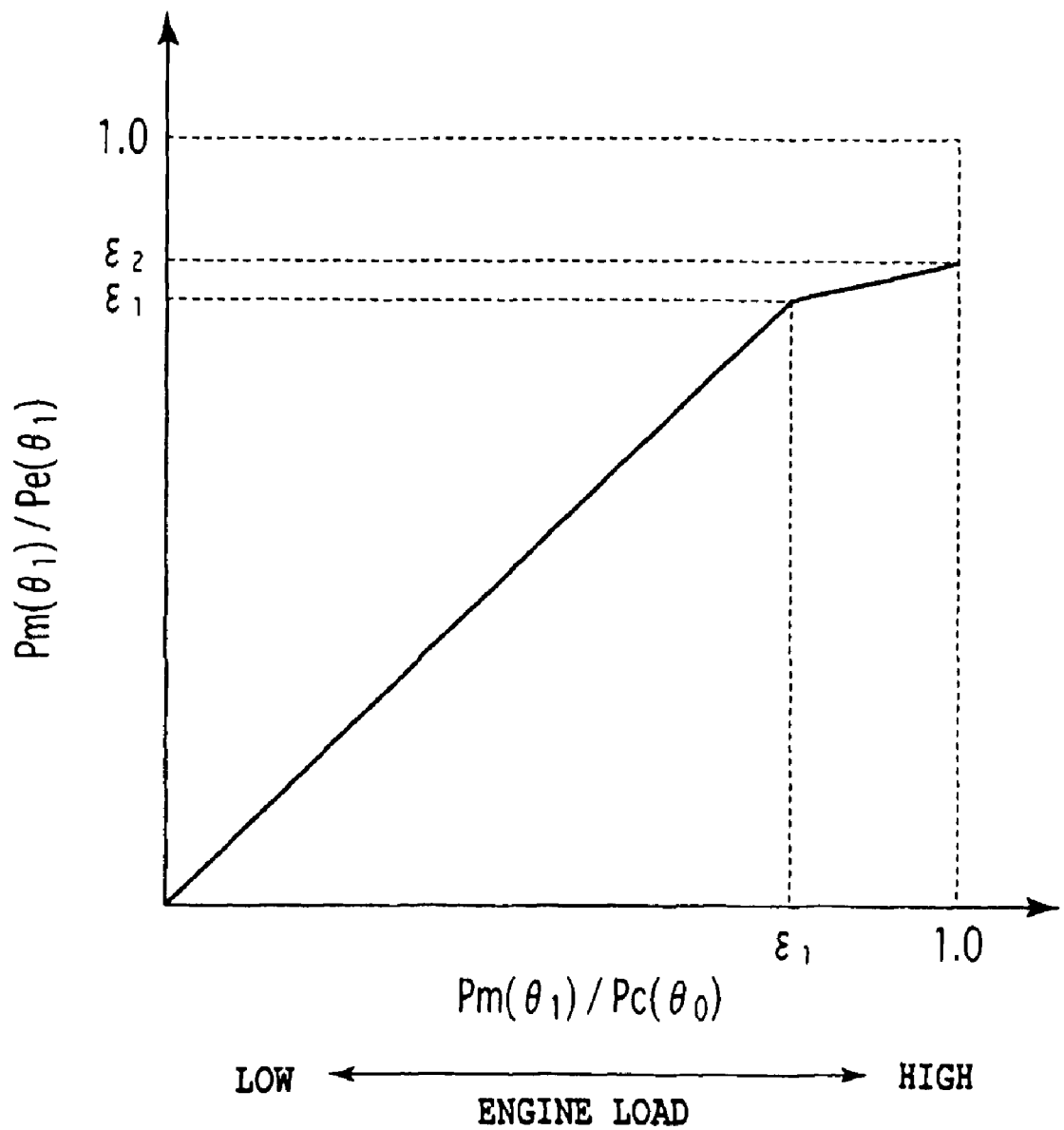
FIG. 4 is an example of a graph representing the relationship between a ratio of an intake air pressure at a predetermined timing during the valve-overlap relative to an in-cylinder pressure directly before or at the beginning of the valve-overlap and a ratio of a pressure of the intake air relative to a pressure of discharge gas at a predetermined timing during the valve-overlap.

In the example shown in FIG. 4, the relationship between Pm(θ1)/Pc(θ0) and Pm(θ1)/Pe(θ1) is approximated by using two straight lines; that is, in a range of 0≦Pm(θ1)/Pc(θ0)≦e1 (wherein e1 is a constant defined experimentally or based on experience), Pm(θ1)/Pe(θ1) =Pm(θ1)/Pc(θ0), and in a range of e1≦Pm(θ1)/Pc(θ0)≦1.0, Pm(θ1)/Pe(θ1) is represented by the following formula (8) (where, e2 is a constant defined experimentally or based on experience, and e2>e1). When this approximation is adopted and the answer is negative at S14 in FIG. 2, the value of Pe(θ1) is set in accordance with the following formula (9) at S18:

$$Pm(\theta_1)/Pe(\theta_1) = \frac{\varepsilon_2 - \varepsilon_1}{1 - \varepsilon_1} \cdot (Pm(\theta_1)/Pc(\theta_0) - \varepsilon_1) + \varepsilon_1 \quad (8)$$

$$Pe(\theta_1) = \frac{Pm(\theta_1)}{\left\{\varepsilon_1 + \frac{\varepsilon_2 - \varepsilon_1}{1 - \varepsilon_1} \cdot \left(\frac{Pm(\theta_1)}{Pc(\theta_0)} - \varepsilon_1\right)\right\}} \quad (9)$$

While the intake air pressure sensor 16 for detecting the intake air pressure is provided in the surge tank 8 in this embodiment, this sensor 16 may be eliminated, and the intake air pressure. Pm(θ1) at the predetermined timing during the valve-overlap (at which the crank angle becomes θ1) may be estimated based on the in-cylinder pressure.

That is, the intake air pressure and the in-cylinder pressure are approximately equal to each other at the bottom dead center of the intake stroke. In a four-cylinder engine, the timing at which the valve-overlap is executed in a certain combustion chamber 3 approximately coincides with the timing at which the bottom dead center arrives in another combustion chamber 3 wherein the intake stroke advances ¼ cycle (180 degrees) relative to the aimed combustion chamber 3. Accordingly, from such a standpoint, the intake air pressure during the valve-overlap in a certain combustion chamber 3 may be estimated based on the in-cylinder pressure at the bottom dead center of the intake stroke in another combustion chamber 3 which intake stroke advances ¼ cycle relative to the aimed combustion chamber 3. Thereby, the intake air pressure 16 for detecting the intake air pressure becomes unnecessary to further save the cost required for calculating the amount of air sucked in the respective combustion chamber 3.

Figure 5:
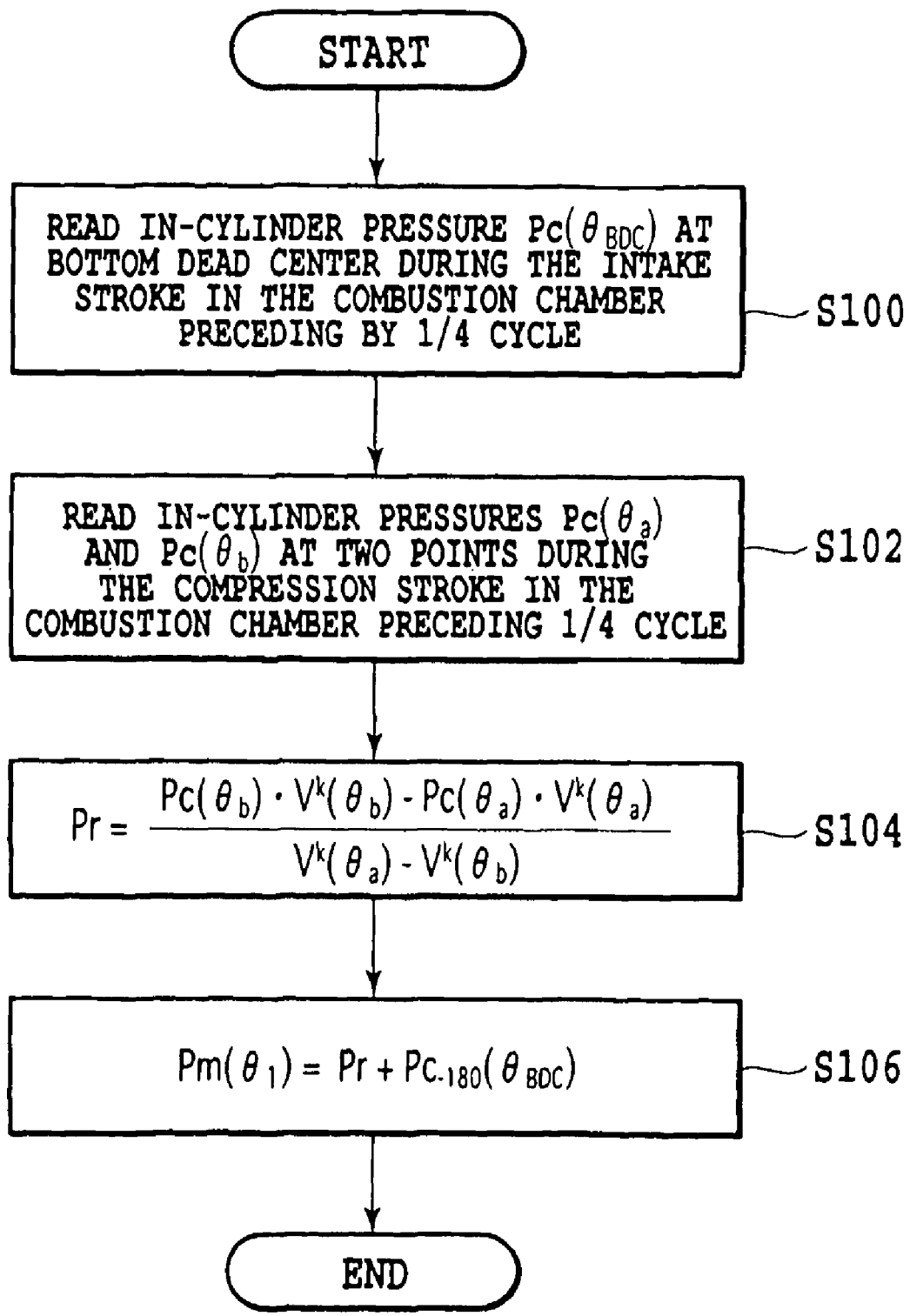
FIG. 5 is a flow chart for explaining a routine for estimating the intake air pressure at a predetermined timing during the valve-overlap based on the in-cylinder pressure.

FIG. 5 is a flow chart for explaining the routine for estimating the intake air pressure at a predetermined timing during the valve overlap, based on the in-cylinder pressure. The routine shown in FIG. 5 is executed by ECU, 20, for example, at a predetermined timing prior to S14 in FIG. 2. In this case, ECU 20 reads the newest value Pc(θBDC) from a predetermined memory area, detected by the in-cylinder pressure sensor 15 at the bottom dead center of the intake stroke in a combustion chamber wherein the intake stroke advances ¼ cycle relative to the aimed combustion chamber 3 (at S100). Further, ECU 20 reads values Pc(θa) and Pc(θb) detected by the in-cylinder pressure sensor 15 at predetermined two points in the compression stroke following to the above-mentioned bottom dead center of the combustion chamber 3 wherein the intake stroke advances ¼ cycle relative to the aimed compression chamber 3 (at S102). In this regard, the crank angles θa and θb may be optional provided they are contained in the compression stroke.

Since the output (the relative pressure) from the in-cylinder pressure sensor 15 cannot be corrected to an absolute pressure when the intake air pressure sensor 16 is eliminated, the values Pc(θa) and Pc(θb) detected by the in-cylinder pressure sensor 15 are stored in the memory area as they are without being corrected to the absolute pressure (that is, in a state for representing the relative pressure). Here, if the in-cylinder pressure at the crank angle θa after being corrected to an absolute pressure (true value) is referred to as Pa, the in-cylinder pressure at the crank angle θb after being corrected to an absolute pressure (true value) is referred to as Pb, and the absolute pressure correction value of the in-cylinder sensor 15 is referred to as Pr, the following is formulated:

$Pa=Pc(\theta a)+Pr$ $Pb=Pc(\theta b)+Pr$

Also, if it is assumed that the compression stroke of the internal combustion engine is an adiabatic process and a ratio of specific heat is κ, the relationship of Pa·Vκ(θa)=Pb·Vκ(θb) is established, and represented by the following formula (10). The absolute pressure correction value Pr is obtained by the following formula (11) derived from the formula (10):

$$(Pc(\theta_a) + Pr) \cdot V^\kappa(\theta_a) = (Pc(\theta_b) + Pr) \cdot V^\kappa(\theta_b) \quad (10)$$

$$Pr = \frac{Pc(\theta_b) \cdot V^\kappa(\theta_b) - Pc(\theta_a) \cdot V^\kappa(\theta_a)}{V^\kappa(\theta_a) - V^\kappa(\theta_b)} \quad (11)$$

For this purpose, after the processing at S102, ECU 20 calculates the absolute pressure correction value Pr of the in-cylinder pressure sensor 15 while using the values Pc(θa) and Pc(θb) detected by the in-cylinder pressure sensor 15 at the predetermined two points during the compression stroke in the prior combustion chamber 3 and in-cylinder volumes V(θa) and V(θb) at the predetermined two points from the above formula (11) (at S104). In this regard, the values of the in-cylinder volumes V(θa) and V(θb) used at S104 have preliminarily been calculated and stored in the memory, and ECU 20 reads these values of in-cylinder volumes V(θa) and V(θb) from the memory and uses for the processing at S20.

After obtaining the absolute pressure correction value Pr at 104, ECU 20 calculates the intake air pressure Pm(θ1) in the aimed combustion chamber 3 during the valve-overlap by using the value Pc(θBDC) detected at S100 by the in-cylinder pressure sensor 15 at the bottom dead center in the intake stroke and the intake air pressure Pm(θ1) during the valve-overlap in the aimed combustion chamber 3 obtained at S104 (at S106). That is, the intake air pressure Pm(θ1) during the valve-overlap in a certain combustion chamber 3 can be calculated by the following formula:

$Pm(\theta 1)=Pr+Pc-180(\theta BDC)$ where Pc−180(θBDC) is an in-cylinder pressure at the bottom dead center in the combustion chamber 3 in which the intake stroke advances ¼ cycle (1/N cycle in the N-cylinder engine) relative to the aimed combustion chamber 3. By executing the routine shown in FIG. 5 in such a manner, it is possible to accurately calculate the amount of air sucked in the respective combustion chamber 3 without using the intake air pressure sensor for detecting the intake air pressure, based on the in-cylinder pressure P(θ) and the cylinder volume V(θ) (based on the product value P(θ)·Vκ(θ) of the in-cylinder pressure P(θ) and the value Vκ(θ) obtained by repeatedly multiplying the in-cylinder volume $V(\theta)$ itself $\kappa$ times (where $\kappa$ is the predetermined index corresponding to the ratio of specific heat).

The intake air amount of the combustion chamber 3 in the respective cylinder calculated in the above manner is more accurate than that obtained from the value detected by the airflow meter 21. This is because the intake air amount is calculated based on the in-cylinder pressure or others in the present cycle of the aimed cylinder, and it is not necessary to take into account of a time delay caused by a distance from the aimed cylinder to the airflow meter 21, the variation of the engine operating state due to such a time delay, the inter-cylinder variety or others. Accordingly, by controlling the ignition timing while using such an intake air amount, it is possible to accurately execute the ignition at the optimum ignition timing.

The ignition timing control according to the invention using the intake air amount calculated by the above-mentioned method (hereinafter referred to as a method using the in-cylinder pressure) will be described below.

Figure 7:
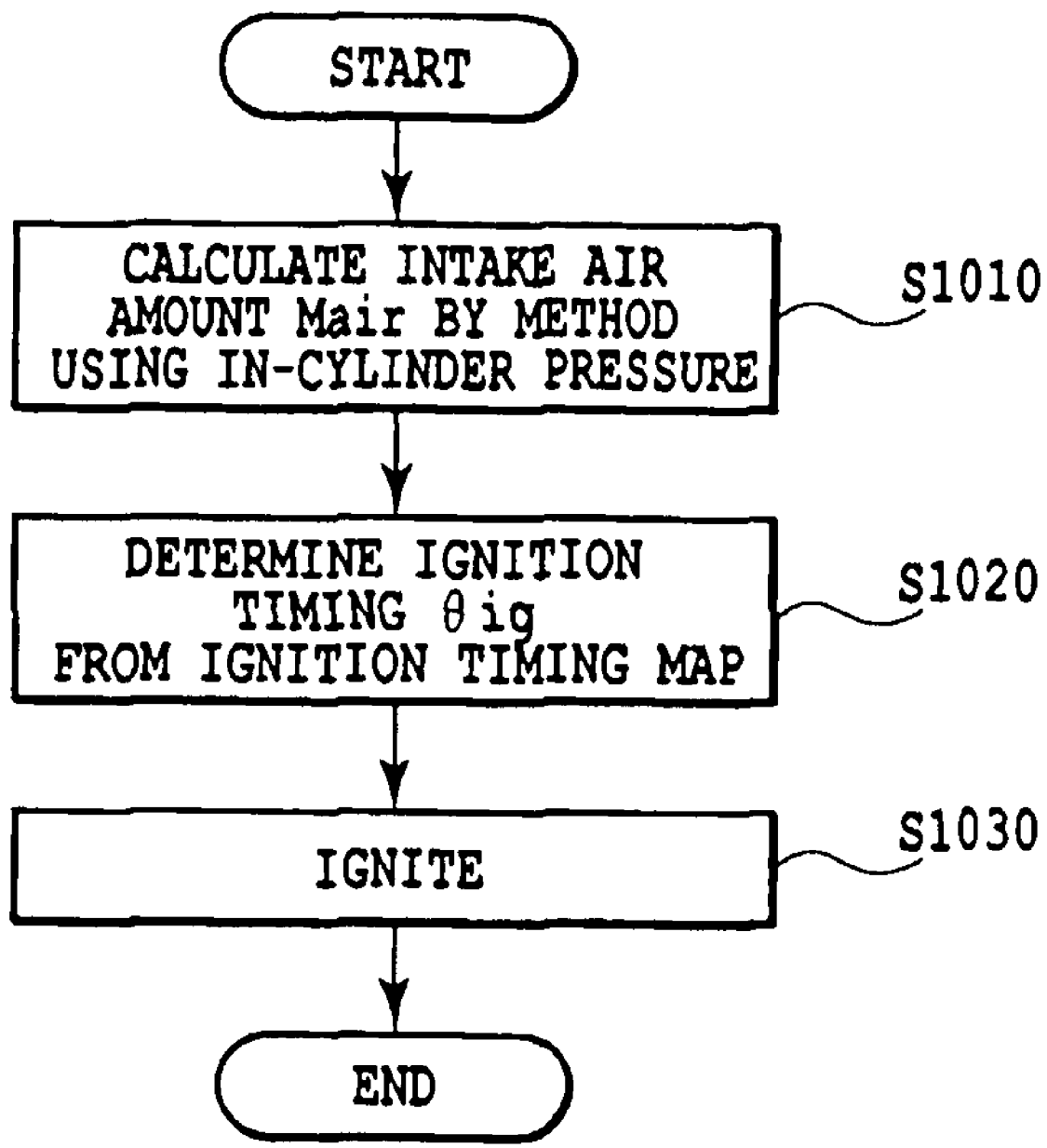
FIG. 7 is a flow chart of a routine for controlling the ignition timing according to the first aspect.

FIG. 7 illustrates a control routine according to a first aspect of the ignition timing control. When the internal combustion engine 1 starts, the ignition timing control routine shown in FIG. 7 is repeated in the respective combustion chamber 3 by ECU 20. First, ECU 20 calculates the intake air amount Mair by the method using the in-cylinder pressure described above (at S1010). Then, ECU 20 determines the ignition timing $\theta ig$ based on the calculated intake air amount Mair and the engine revolution $Ne(\theta 1)$ by using a predetermined map (or a function) (at S1020). In this regard, since the engine revolution $Ne(\theta 1)$ has been obtained when the intake air amount Mair is calculated (see S20 in FIG. 2 and the above-mentioned formula (2)), the engine revolution $Ne(\theta 1)$ is preferably used also at this step S1020. In the map (or the function) used here, the ignition timing relative to the intake air amount and the engine revolution is established based on the experiment or others so that the maximum engine output is obtainable while suppressing the generation of knocking and NOx. Thereafter, ECU 20 supplies electric current to the ignition plug 7 to execute the ignition at the same time as the crank angle detected by the crank angle sensor 14 coincides with the determined ignition timing $\theta ig$ (that is, at the same time as the ignition timing $\theta ig$ has been reached) (at S1030).

According to the first aspect of the ignition timing control, since the ignition timing $\theta ig$ is determined without using the airflow meter 21 based on the accurate intake air amount calculated by the in-cylinder pressure using method and the ignition is executed at this ignition timing $\theta ig$, the ignition timing is more optimized than the prior art wherein, the intake air amount determined based on the detected value of the airflow meter 21. Thus, it is possible to obtain the maximum engine output as large as possible while suppressing the generation of knocking and NOx. In this aspect, since the airflow meter 21 is eliminated, the cost can be saved.

Figure 8A:
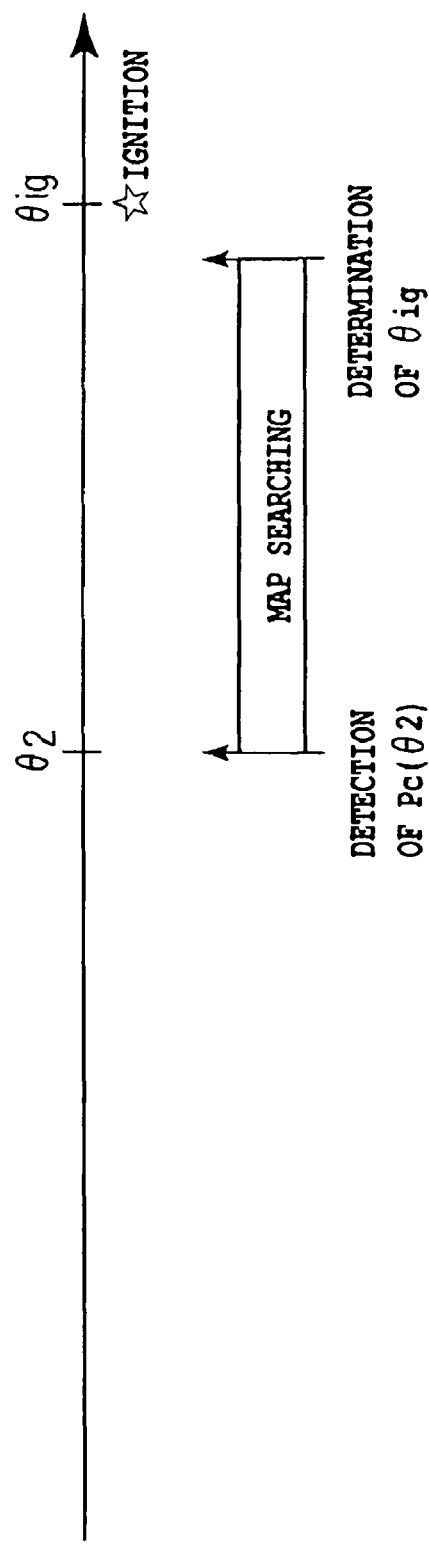
FIGS. 8A and 8B are timing charts representing the execution timing for the respective processing of the ignition timing control according to the first and second aspects.

According to the first aspect of the ignition timing control, as shown in FIG. 8A, after the in-cylinder pressure $Pc(\theta 2)$ is detected by in-cylinder pressure detection means (the in-cylinder pressure sensor 15) at the predetermined timing $\theta 2$ in the compression stroke (the timing after the closing of the intake valve and before the ignition timing $\theta ig$; hereinafter referred to as an end of the sampling of the in-cylinder pressure), the intake air amount Mair is calculated and then the ignition timing $\theta ig$ is determined by the searching of the ignition timing map, and the ignition is executed simultaneously with the arrival of the ignition timing $\theta ig$.

On the other hand, the end of the sampling of the in-cylinder pressure is preferably set as close as possible to the ignition timing $\theta ig$ (in other words, retarded) for the following reasons. If so, a period from the end of the sampling of the in-cylinder pressure to the ignition timing $\theta 2$ becomes short, not to ensure enough calculation time, and in the worst case, there may be a risk that the ignition timing $\theta ig$ cannot be determined before the actual ignition timing $\theta ig$. That is, since there is an air flow in the combustion chamber 3 directly after closing the intake valve, an accurate in-cylinder pressure $Pc(\theta 2)$ is not always detectable in such a state. Accordingly, the detection of the in-cylinder pressure $Pc(\theta 2)$ is preferably executed when there is no air disturbance in the combustion chamber, that is, a certain period after the opening of the intake valve. Also, the timing for detecting the in-cylinder pressure $Pc(\theta 2)$ is preferably as late as possible since the obtained in-cylinder pressure $Pc(\theta 2)$ itself becomes higher to minimize the detection error. Because of the reason described above, the timing for detecting the in-cylinder pressure $Pc(\theta 2)$ is retarded as late as possible.

In this regard, the retarded detection timing of the in-cylinder pressure $Pc(\theta 2)$ is equivalent to the shortening of the period from its timing $\theta 2$ to the ignition timing $\theta ig$, whereby ECU 20 is required for the rapid processing. In addition, the ignition map is a two-dimensional map wherein the intake air amount and the engine revolution are parameters thereof, and the searching thereof is relatively time-consuming. Further, the higher the engine revolution, the shorter a period from the detection timing of the in-cylinder pressure $Pc(\theta 2)$ to the ignition timing $\theta ig$. In practice, the timing $\theta 2$ is determined while taking a balance into account, between the detection accuracy of the in-cylinder pressure and the processing speed of ECU 20. An period from the detection timing $\theta 2$ of the in-cylinder pressure $Pc(\theta 2)$ (in this embodiment, 50° before the top, dead center in the compression stroke) to the ignition timing $\theta ig$ on the map is only approximately 20 to 40°, whereby ECU 20 must determines the ignition timing within such a short period.

Figure 9:
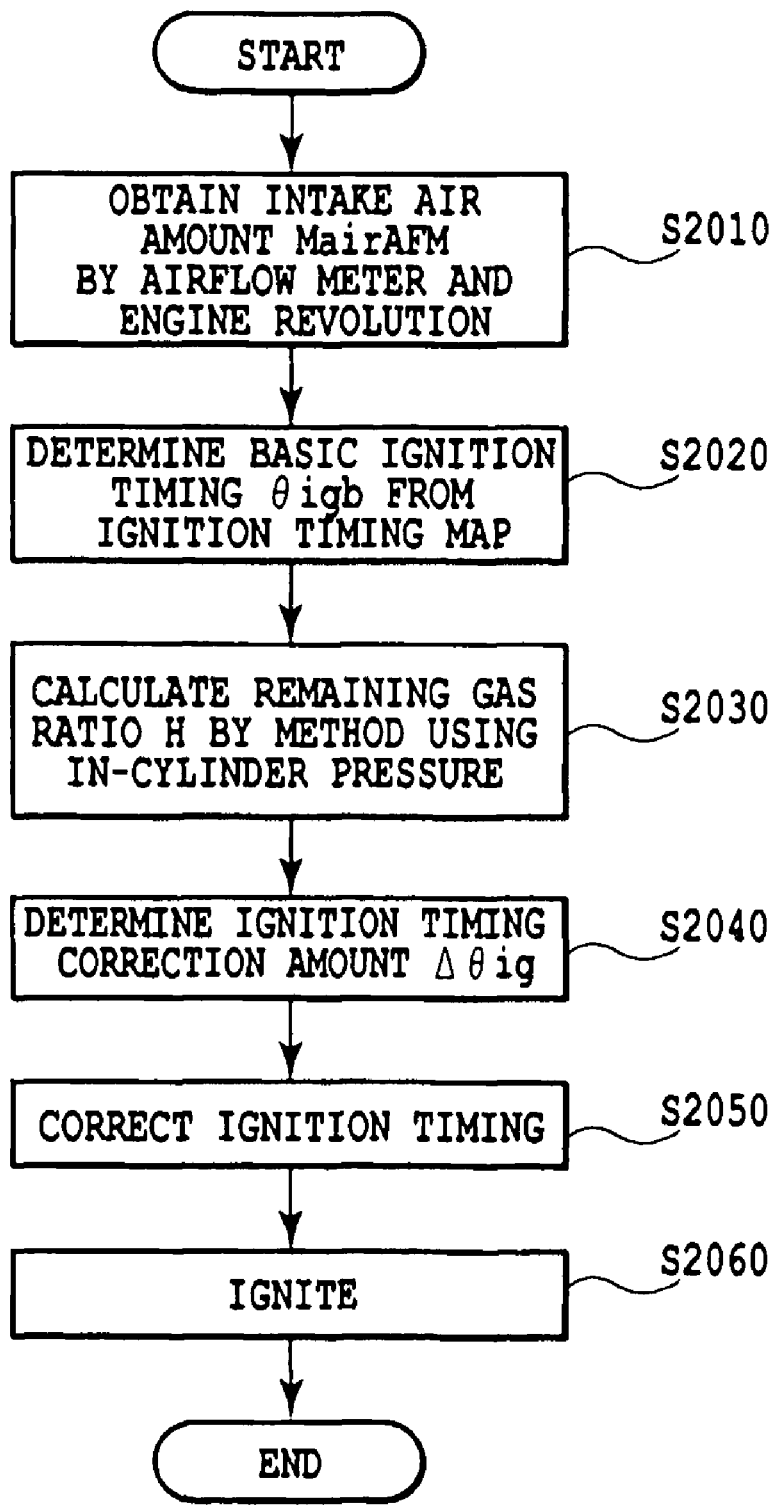
FIG. 9 is a flow chart of a routine for controlling the ignition timing according to the second aspect.

A second aspect of the ignition timing control suitable for eliminate such a problem will be explained based on FIG. 9. Here, the ignition timing control routine shown in FIG. 9 is repeatedly executed by ECU 20 in the respective combustion chamber 3.

ECU 20 obtains the intake air amount MairAFM based on the value detected by the airflow meter 21 first, and then the engine revolution (at S2010). While the engine revolution obtained here is preferably the engine revolution $Ne(\theta 1)$ at the timing $\theta 1$ used in the method using the in-cylinder pressure on a view point of the common use of data, this is not always necessary. Next, ECU 20 temporarily determines the ignition timing $\theta igb$ that becomes a base by using the ignition timing map, based on the obtained intake air amount MairAFM and the engine revolution $Ne(\theta 1)$ (at S2020). The above-mentioned procedure is the same as the prior art one for determining the ignition timing, and the ignition timing $\theta igb$ determined here is not always the optimum ignition timing, but usable as a rough ignition timing for simplifying the post processing.

Thereafter, ECU 20 calculates the remaining gas ratio H while using the above-mentioned method using the in-cylinder pressure shown in FIG. 2 (at S2030). That is, the formula (7) at S32 of FIG. 2 is rewritten to the following formula (7)':

$$\beta \cdot Pc(\theta) = Mair + \beta \cdot \Delta Pc \qquad (7)'$$

wherein the intake air amount Mair on the right side stands for an amount of freshly introduced air in a gas existing in the combustion chamber 3, $\beta \cdot \Delta Pc$ on the right side stands for an amount of remaining gas in the gas existing in the combustion chamber 3, and β·ΔPc(θ) on the left side that is a sum of them stands for a total amount of gas existing in t combustion chamber 3. ECU 20 calculates the amount of remaining gas β·ΔPc based on the intake air amount Mair obtained at S32 in FIG. 2, and calculates the ratio of remaining gas in the combustion chamber 3; H=β·ΔPc/β·Pc(θ2)=ΔPc/Pc(θ2), based on the amount of the remaining gas β·ΔPc and the total gas amount β·Pc(θ2) in the combustion chamber 3.

ECU 20 determines the ignition timing correction amount Δθig based on this ratio H of remaining gas by using the predetermined map (or function) (at 2040). This map (function) is set by experiments or others so that the maximum engine output is obtained while suppressing the knocking and NOx.

Figure 10:
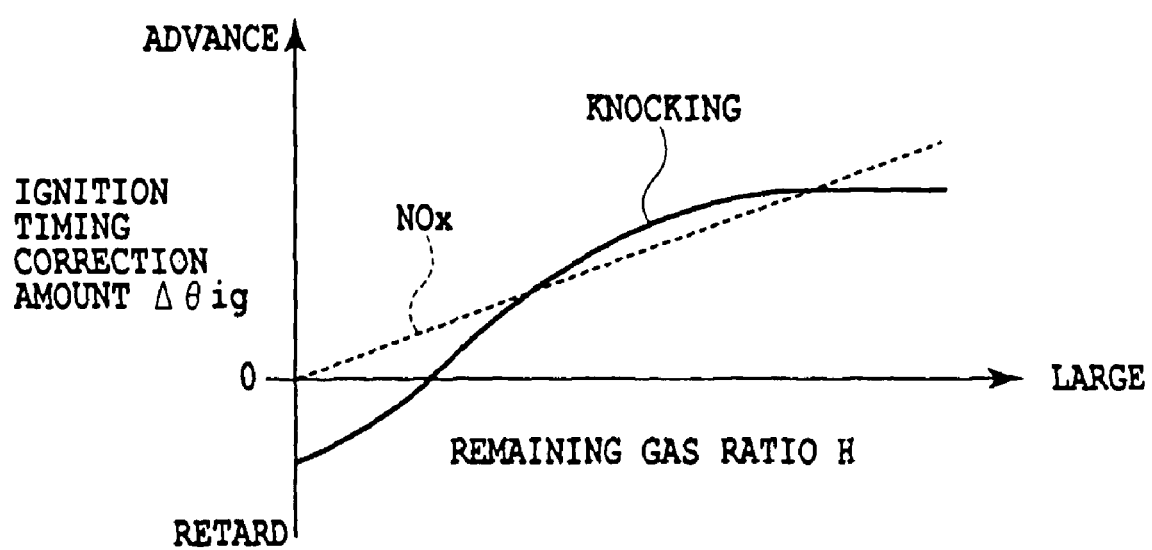
FIG. 10 is an ignition timing correction amount map of the ignition timing control according to the second aspect.

One favorable example of this ignition timing correction amount map is shown in FIG. 10. In FIG. 10, a horizontal axis represents the ratio H of remaining gas (that becomes larger as going rightward) and a vertical axis represents the ignition timing correction amount Δθig (that becomes more advance as going upward). A solid line and a broken line represent the relationship between the ratio H of remaining gas and the ignition timing correction amount Δθig determined by taking the knocking margin and the NOx margin into account, respectively.

When the knocking margin is taken into account, the knocking is suppressed if the ignition timing correction amount Δθig just on or beneath the solid line (on the retard side) is selected. Contrarily, if the ignition timing correction amount Δθig above the solid line on the advance side) is selected, there may be a possibility of generating the knocking. Also, when the NOx margin is taken into account, the NOx generation amount is suppressed below the predetermined allowable amount if the ignition timing correction amount Δθig just on or beneath the broken line (on the retard side) is selected. Contrarily, if the ignition timing correction amount Δθig above the broken line (on the advance side) is selected, there may be a possibility that the NOx generation amount exceeds the predetermined allowable amount. On the other hand, on the view point of the engine output, the ignition timing correction amount Δθig is preferably on the advance side as deep as possible.

For this reason, ECU 20 selects a smaller one (on the retard side) of values corresponding to the ratio H of remaining gas on the solid and broken lines, and determines this value as an ignition timing correction amount Δθig at S2040. Thereby, it is possible to obtain the maximum engine output while suppressing both of the knocking and NOx.

Thereafter, ECU 20 corrects the ignition timing by adding the ignition timing correction amount Δθig obtained at S2040 to the ignition timing θigb obtained at S2020 to determine a final ignition timing θig (at S2050). That is, θig=θigb+Δθig. Then, ECU 20 supplies electric current to the ignition plug 7 simultaneously with the arrival of the ignition timing θig to execute the ignition (at S2060).

Figure 8B:
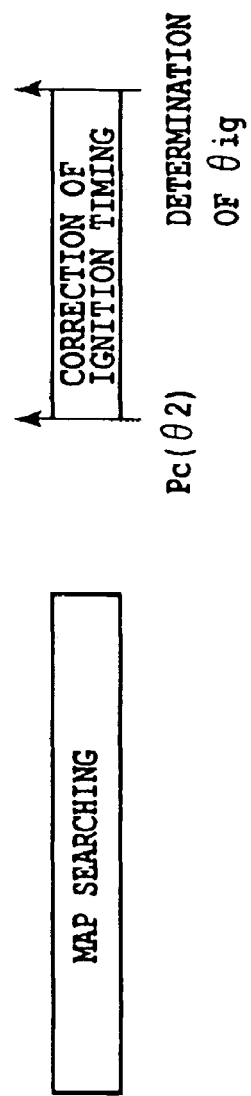

According to the second aspect of the ignition timing control, as shown in FIG. 8B, the basic ignition timing θig is first determined by the searching of the ignition timing map based on the value detected by the airflow meter 21, before the predetermined timing θ2 (the end of the sampling of the in-cylinder pressure), then the searching of the ignition timing correction amount map shown in FIG. 10 is executed to determine the ignition timing correction amount Δθig after the timing θ2. Thus the final ignition timing θig is obtained.

The ignition timing correction amount map shown in FIG. 10 is a one-dimensional map using as a parameter solely the ratio H of remaining gas, the searching of which requires a shorter time than the searching of the two dimensional ignition timing map. The searching of the ignition timing map requiring a relatively long time is transferred to a period having a relatively large margin before the timing θ2. Accordingly, a time required for determining the ignition timing θig after the timing θ2 can be shorter than in the first aspect, whereby the calculation can be possibly finished by the actual ignition timing θig. Also, the timing θ2 may be more lately determined. In this case, it is possible to more improve the detection accuracy of the intake air amount as well as the accuracy of the ignition timing control.

While the basic ignition timing θig is determined based on the value detected by the airflow meter 21 in this example, a method for determining the basic ignition timing θig is optional. For example, without using the airflow meter 21, the intake air amount may be estimated by the following air model method, and based on the estimated intake air amount, the basic ignition timing θigb may be determined from the ignition timing map. The air model method is a method wherein the relationship between the intake air amount and parameters (for example, an opening degree of the throttle or an engine revolution) other than the intake air amount is preliminarily determined in a map or a function form (those thus determined is an air model) and the intake air amount is estimated based on the detected data of these other parameters. According to this air model method, it is unnecessary to take the time delay caused when air is transferred from the airflow meter to the in-cylinder combustion chamber into account, whereby a so-called pre-recognized detection is possible. Thus, if the air model method is used, there may be a possibility in that the detection accuracy of the intake air amount or the accuracy of the ignition timing control is furthermore improved. Also, since the airflow meter can be eliminated, this is advantageous for the cost saving.

In the second aspect, if the determination of the ignition timing θig is not in time before the actual ignition timing θig because the engine revolution is high, that is, if the engine revolution exceeds the predetermined value, the routine skips S2030, S2040 and S2050, and the basic ignition timing θigb determined at S2020 may be used as it is for executing the ignition.

In addition, in the second aspect, it is preferable to change the predetermined timing (end of the sampling of the in-cylinder pressure) θ2 during the compression stroke in accordance with the operating state of the internal combustion engine (preferably the engine rotational speed). For example, ECU 20 determines the end of the sampling of the in-cylinder pressure at S2020, based on the engine revolution obtained at S2010, in accordance with the predetermined map (or the function). In the map, the relationship between the engine revolution and the end θ2 of the sampling of the in-cylinder pressure is stored, capable of obtaining the earlier end θ2 of the in-cylinder pressure as the engine revolution increases and securing the period necessary for determining the ignition timing θig. Thereby, it is possible to advance the end θ2 of the sampling of the in-cylinder pressure as the engine revolution increases, and stably ensure the time necessary for determining the ignition timing θig from the end θ2 of the sampling of the in-cylinder pressure. Also, when the engine revolution is low, the end θ2 of the sampling of the in-cylinder pressure can be retarded to improve the detection accuracy of the intake air amount and the accuracy of the ignition timing control. In this connection, also in the first aspect, it is possible to change the end θ2 of the sampling of the in-cylinder pressure in the same manner in accordance with the operating state of the internal combustion engine (preferably the rotational speed of the engine).

Further, in the second aspect, the predetermined timing (the end of the sampling of the in-cylinder pressure) $\theta 2$ during the compression stroke may be changed in accordance with the basic ignition timing $\theta igb$ determined at S2020. For example, ECU 20 determines the end $\theta 2$ of the sampling of the in-cylinder pressure based on the basic ignition timing $\theta igb$ determined at S2020, in accordance with the predetermined map (or function). At this time, in the map, the relationship between the basic ignition timing $\theta igb$ and the end $\theta 2$ of the sampling of the in-cylinder pressure is preliminarily input to be capable of obtaining the early end $\theta 2$ of the sampling of the in-cylinder pressure as the basic ignition timing $\theta igb$ is earlier as well as of securing the time necessary for determining the ignition timing $\theta ig$. Since the finally determined ignition timing becomes earlier as the basic ignition timing $\theta igb$ is earlier, it is possible to stably ensure the time from the end $\theta 2$ of the sampling of the in-cylinder pressure necessary for determining the ignition timing $\theta ig$ by changing the end $\theta 2$ of the sampling of the in-cylinder pressure in association with the basic ignition timing $\theta igb$.

Next, a third aspect of the ignition timing control will be described below. The characteristic of the third aspect is that the actual output torque is advantageously close to the target torque at a high accuracy in a so-called torque-demand control. In the control device for the internal combustion engine according to the third aspect, ECU 20 determines a target torque Td to be output from the internal combustion engine 1 based on the opening degree of the accelerator detected by the accelerator opening degree sensor 22 in the respective combustion chamber 3, while using the predetermined map (or function). Various parameters other than the opening degree of the accelerator, such as a vehicle speed, may be used for determining the target torque Td. Then, ECU 20 controls the opening degree of the throttle valve 10 based on the target torque Td with reference to the predetermined map (or function) so that the torque actually output from the internal combustion engine 1 coincides with the target torque Td and controls the intake air amount. Accordingly, the intake air amount is controlled to a value basically corresponding to the target torque Td.

Figure 11:
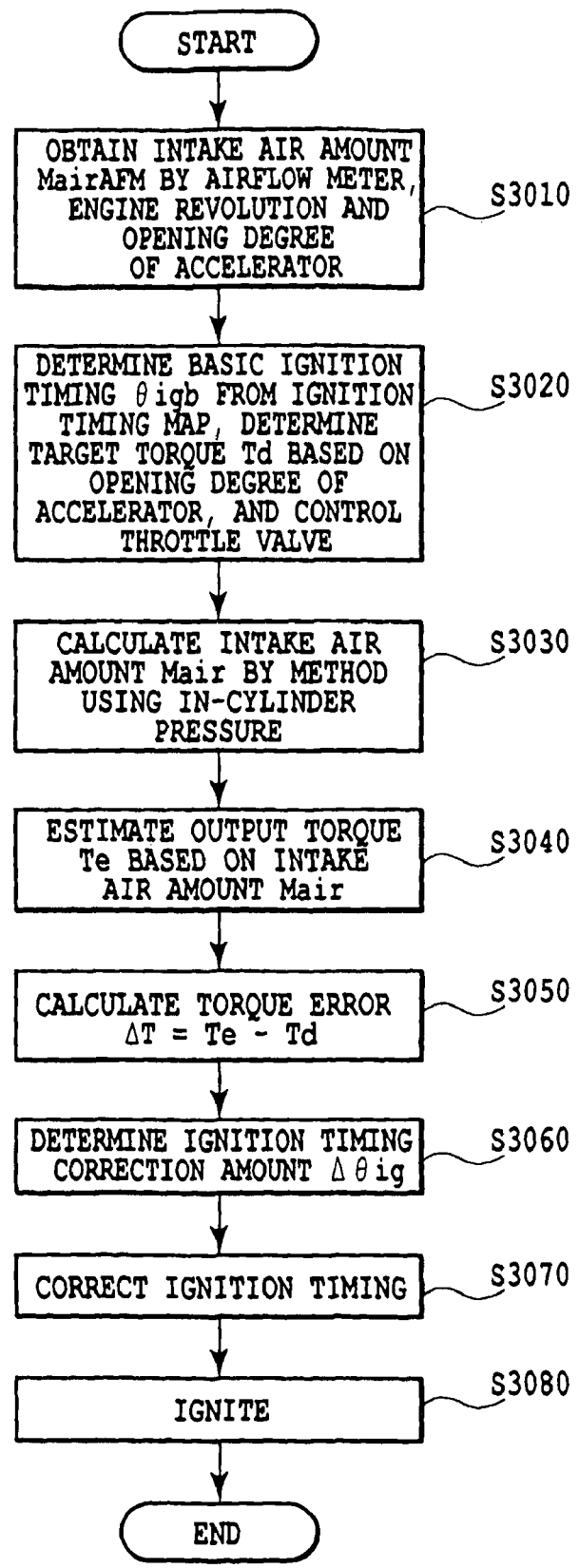
FIG. 11 is a flow chart of a routine of the ignition timing control according to a third aspect.

FIG. 11 illustrates a routine according to a third aspect of the ignition timing control. The ignition timing control routine shown in FIG. 11 is repeated by ECU 20 in the respective combustion chamber 3.

First, ECU 20 obtains the intake air amount MairAFM based on the value detected by the airflow meter 21 to determine the engine revolution, and obtains the opening degree of the accelerator detected by the accelerator opening degree sensor 22 (at S3010). In the same manner as at S2010, while the engine revolution is preferably the engine revolution Ne($\theta 1$) at the timing $\theta 1$, the engine revolution at a different timing may be allowable. Instead of the intake air amount MairAFM detected by the airflow meter 21, that estimated by the air model may be used.

Then, ECU 20 determines the basic ignition timing $\theta igb$ by using the ignition timing map based on the obtained intake air amount MairAFM and the engine revolution Ne($\theta 1$). Also, ECU 20 determines the target torque Td based on at least the opening degree of the accelerator obtained from the predetermined map (or function), and based on this target torque Td, while referring to the map (or function), controls the opening degree of the throttle valve 10 to control the intake air amount to a value in accordance with the target torque Td (at S3020).

Further, in the same manner as at S1010 in FIG. 7, ECU 20 calculates the intake air amount Mair by the in-cylinder pressure using method shown in FIG. 2 (at S3030). Thereafter, ECU 20 calculates an output torque Te which is an estimation value of a torque practically output from the internal combustion engine 1, based on the calculated intake air amount Mair by a procedure described below as one example (at S3040).

Figure 12:
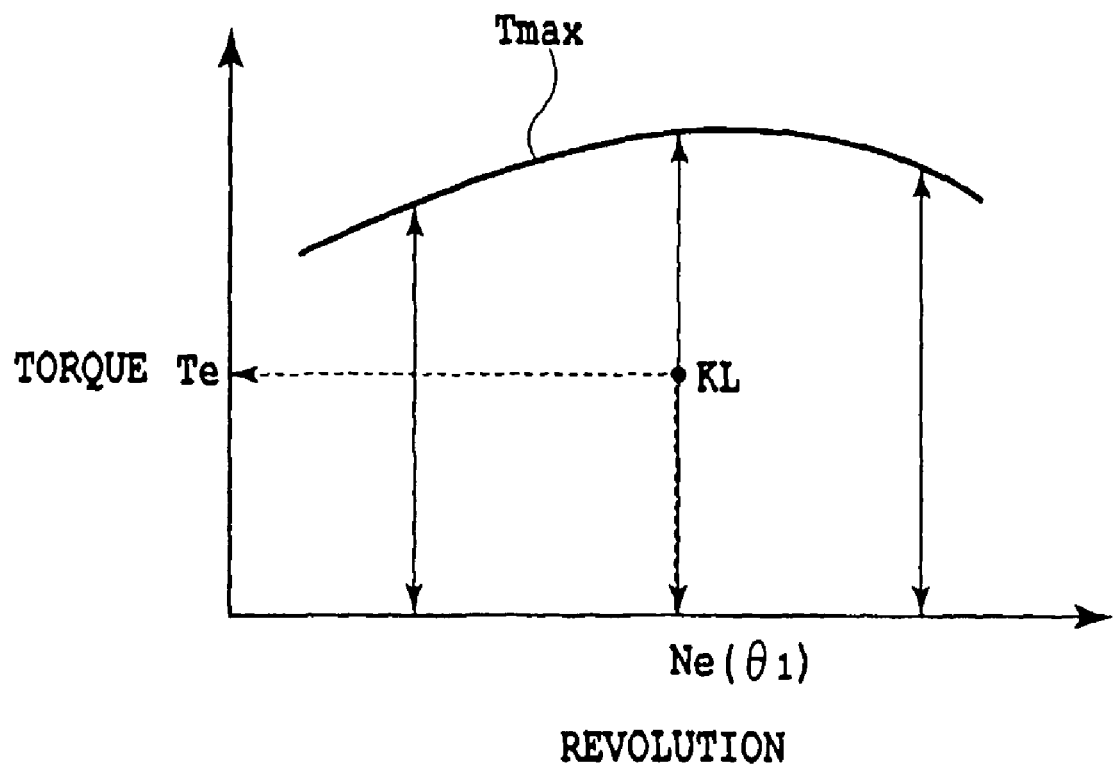
FIG. 12 is a graph for explaining the estimation method of the output torque.

FIG. 12 is the illustration for explaining a method for estimating the output torque Te, more concretely, the maximum torque diagram of the internal combustion engine 1. On any of points on the maximum torque curve Tmax, the opening degree of the throttle valve is maximum (100%) and the intake air amount in the combustion chamber 3 becomes also maximal. At this time, a charging efficiency KL becomes the maximum value. The charging efficiency KL is a ratio of a mass AG of fresh air actually in the in-cylinder combustion chamber 3 relative to a mass AGmax of fresh air in a volume of the in-cylinder combustion chamber 3 at a bottom dead center of the piston. That is, KL=AG/AGmax. While the maximum value of the charging efficiency KL is theoretically 1 (100%), it is practically less than 1 due to the intake resistance or others. However, it may be actually thought as 1 as a matter of convenience.

The maximum value of the intake air amount at the respective revolution on the maximum torque curve Tmax is preliminarily obtained by the experiment and stored in a form of map (or function) in ECU 20. ECU 20 obtains the maximum value of the intake air amount corresponding to the engine revolution (for example, Ne($\theta 1$)) obtained at S3010, divides the intake air amount Mair obtained at S3030 by the in-cylinder pressure using method with the maximum value of the intake air amount to calculate the charging efficiency. Then, ECU 20 estimates the output torque Te based on the calculated charging efficiency KL and the engine revolution (for example, Ne($\theta 1$)) by using the predetermined map (or function).

The output torque Te thus estimated is ought to be a value closer to the target torque Td, because the throttle valve 10 is preliminarily controlled to regulate the intake air amount so that such result is obtained. However, the actual intake air amount (=Mair) does not always coincide with the predetermined target value. Accordingly, the output torque estimated based on the actual intake air amount Mair may be different from the target torque Td.

Figure 13:
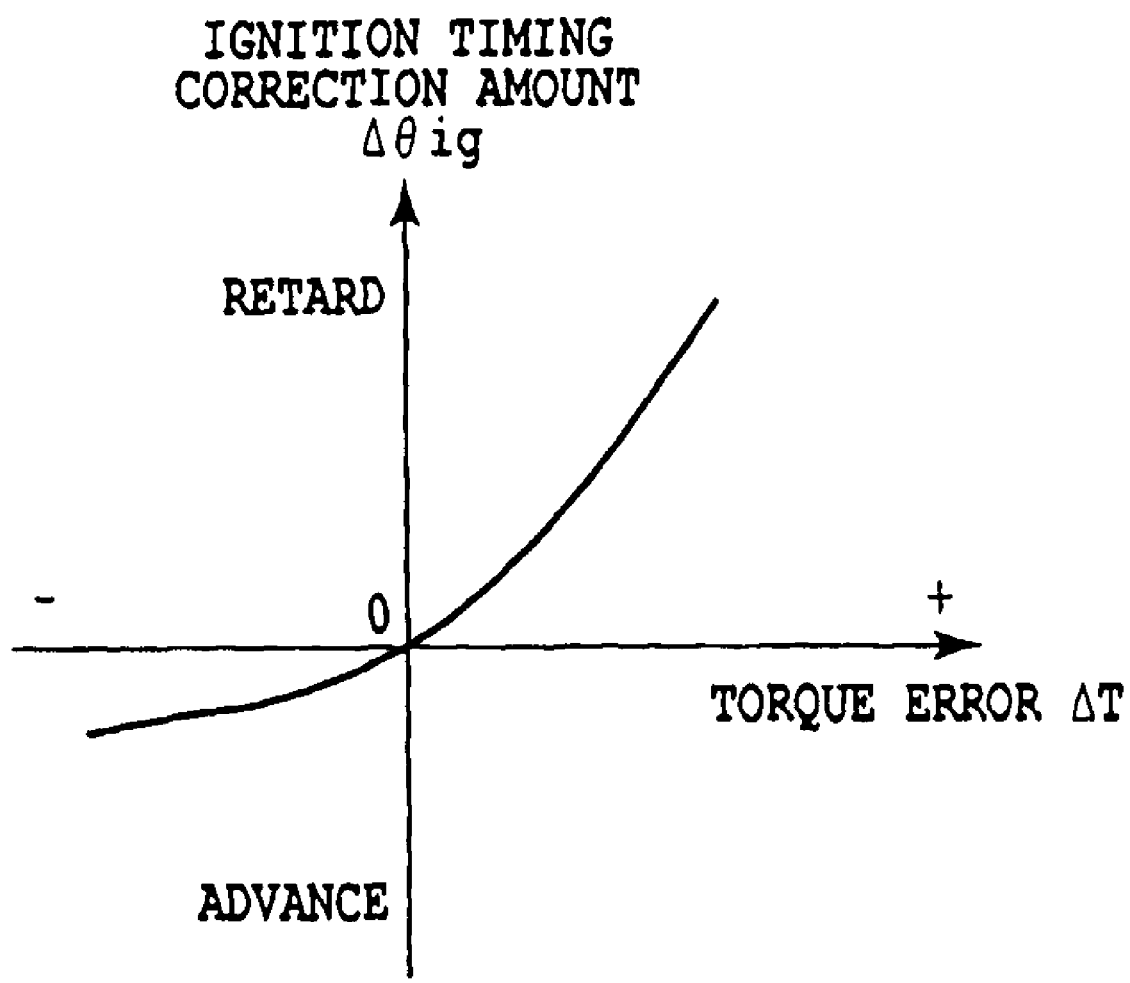
FIG. 13 is an ignition timing correction amount map of the ignition timing control according to the third aspect.

To compensate for this difference, the correction of the ignition timing is executed. As shown in FIG. 11, ECU 20 calculates the difference between the output torque Te and the target torque Td; that is, the torque error $\Delta T = Te - Td$ (at S3050) and, based on this torque error $\Delta T$, the ignition timing correction amount $\Delta \theta ig$ is calculated from the predetermined map (or function) as shown in FIG. 13 (at S3060). In the map shown in FIG. 13, the ignition timing correction amount $\Delta \theta ig$ is set to be larger on the retard side as the torque error $\Delta \theta ig$ is larger in the plus direction, while the ignition timing correction amount $\Delta \theta ig$ is set to be larger on the advance side as the torque error $\Delta \theta ig$ is larger in the minus direction. Note that if the torque error $\Delta T$ is zero, the ignition timing correction amount is also zero. Thereafter, ECU 20 adds the ignition timing correction amount $\Delta \theta ig$ obtained at S3060 to the basic ignition timing $\theta igb$ obtained at S3020 to correct the ignition timing and determines the final ignition timing $\theta ig$ (at S3070). That is, $\theta ig = \theta igb + \Delta \theta ig$. Then, ECU 20 supplies electric current to the ignition plug 7 at the same time as the arrival of the ignition timing $\theta ig$ to execute the ignition (at S3080).

As being understood from FIG. 13, it is possible to retard the ignition timing as the torque error $\Delta T$ is larger in the plus direction, while to advance the ignition timing as the torque error $\Delta T$ is larger in the minus direction. That is, as the estimated output torque Te is larger than the target torque Td, the ignition timing is retarded to compensate for the increase in the torque, while as the estimated output torque Te is smaller than the target torque Td, the ignition timing is advanced to compensate for the reduction in the torque. Accordingly, it is possible to further close the actually output torque to the target torque Td to improve the accuracy of the torque demand control. Also, it is possible to favorably control the ignition timing to achieve the same.

In this regard, in the same manner as in the second aspect, it is preferable to change the predetermined timing (the end of the sampling of the in-cylinder pressure) θ2 during the compression stroke in correspondence to the operating state of the internal combustion engine, or change the end of the sampling of the in-cylinder pressure θ2 in accordance with the basic ignition timing θigb determined at S3020.

While the embodiments of the present invention have been described above, the embodiments of the present invention should not be limited to those described above. For example, two or more ignition plugs (ignition means) may be provided, wherein both the ignition plugs may by ignited at the same timing or at different timings. When the different ignition timings are adopted, the above-mentioned control of the ignition timing is preferably executed in the ignition plug to which the first ignition is executed. Also, as the ignition means, instead of the ignition plug, an ignition device having a high degree of freedom may be provided, such as a laser type ignition device.

INDUSTRIAL APPLICABILITY

The present invention may be applicable to an internal combustion engine having a valve-driving mechanism capable of changing the valve-opening characteristic in at least one of the intake and exhaust valves.

The invention claimed is:

1. A device for controlling an internal combustion engine, having a valve driving mechanism capable of varying the valve-opening characteristic in at least one of an intake valve and an exhaust valve so that the mixture of fuel and air is burnt in the interior of a combustion chamber to generate power, characterized in that the device comprises in-cylinder pressure detection means for detecting an in-cylinder pressure (Pc) within the combustion chamber, intake air pressure measuring means for either detecting or estimating an intake air pressure (Pm), in-cylinder pressure variation amount calculation means for calculating a variation amount of the in-cylinder pressure (ΔPc) for defining an amount of remaining gas in the combustion chamber due to the valve-overlap of the intake valve and the exhaust valve, intake air amount calculation means for calculating an amount of air sucked in the combustion chamber (Mair) based on the in-cylinder pressure (Pc(θ2)) detected by the in-cylinder pressure detection means at a predetermined timing (θ2) during the compression stroke and before an ignition timing and the variation amount of the in-cylinder pressure (ΔPc) calculated by the in-cylinder pressure variation amount calculation means, ignition means for igniting the gaseous mixture in the combustion chamber, and ignition timing control means for determining the ignition timing (θig) by the ignition means based on the intake air amount (Mair) calculated by the intake air amount calculation means, wherein the intake air amount calculation means calculates the intake air amount (Mair) by using following formula (where, β is a predetermined constant), and $$M_{air} = \beta \cdot (Pc(\theta_2) - \Delta Pc)$$

the in-cylinder pressure variation amount calculation means calculates the variation amount of the in-cylinder pressure (ΔPc) based on the intake air pressure (Pm(θ1)) either detected or estimated by the intake air pressure measuring means at a predetermined timing (θ1) during the valve-overlap, an exhaust gas pressure (Pe(θ1)) at the predetermined timing (θ1) during the valve-overlap, and a gas-passage effective area (S).

2. The device for controlling an internal combustion engine as defined by claim 1, wherein the ignition timing control means determines a basic ignition timing (θigb) based on either an intake air amount (MairAFM) detected by an airflow meter or an intake air amount estimated based on an opening degree of a throttle valve and an engine rotational speed, determines a ratio of remaining gas (H) in the combustion chamber which is a ration of the variation amount of the in-cylinder pressure (ΔPc) calculated by the in-cylinder pressure variation amount calculation means and the in-cylinder pressure (Pc(θ2)) detected by the in-cylinder pressure detection means at the predetermined timing (θ2), determines an ignition timing correction amount (Δθig) based on the ratio of the remaining gas (H), and corrects the basic ignition timing (θigb) based on the ignition timing correction amount (Δθig) to determine the ignition timing (θig).

3. The device for controlling an internal combustion engine as defined by claim 2, wherein the predetermined timing (θ2) during the compression stroke and before the ignition timing is changed in accordance with the basic ignition timing (θigb).

4. The device for controlling an internal combustion engine as defined by claim 1, wherein the predetermined timing (θ2) during the compression stroke and before the ignition timing is changed in accordance with the operating state of the internal combustion engine.

5. The device for controlling an internal combustion engine as defined by claim 4, wherein the predetermined timing (θ2) during the compression stroke and before the ignition timing is changed in accordance with the engine rotational speed (Ne).

6. The device for controlling an internal combustion engine as defined by claim 1, wherein intake air amount control means is further provided for controlling the intake air amount so that a torque output from the internal combustion engine coincides with a target torque (Td) determined based on an opening degree of an accelerator, and the ignition timing control means determines a basic ignition timing (θigb) based on an intake air amount (MairAFM) detected from an airflow meter or an intake air amount estimated based on an opening degree of a throttle valve and an engine rotational speed, estimates an output torque (Te) from the internal combustion engine based on the intake air amount (Mair) calculated by the intake air amount calculation means, determines an ignition timing correction amount (Δθig) based on the estimated output torque (Te) and the target torque (Td), and corrects the basic ignition timing (θigb) based on the ignition timing correction amount (Δθig) to determine the ignition timing (θig).

7. The device for controlling an internal combustion engine as defined by claim 1, wherein the internal combustion engine has a plurality of combustion chambers, each having the in-cylinder pressure detection means, wherein the intake air pressure measuring means obtains the detected in-cylinder pressure (Pc(θBDC)) at the bottom dead center of the intake stroke in a combustion chamber wherein the intake stroke advances 1/N cycle relative to the aimed combustion chamber (where, N represents the number of cylinders), obtains the detected in-cylinder pressures ($Pc(\theta a)$, $Pc(\theta b)$) at predetermined two points ($\theta a, \theta b$) in the compression stroke following to the bottom dead center of the combustion chamber, calculates the absolute pressure correction value (Pr) of the in-cylinder pressure detection means while using the detected in-cylinder pressures ($Pc(\theta a)$, $Pc(\theta b)$) and in-cylinder volumes ($V(\theta a)$, $V(\theta b)$) at the predetermined two points ($\theta a, \theta b$), and estimates the intake air pressure ($Pm(\theta 1)$) in the aimed combustion chamber during the valve-overlap by using the detected in-cylinder pressure ($Pc(\theta BDC)$) and the absolute pressure correction value (Pr).

8. The device for controlling an internal combustion engine as defined by claim 2, wherein the predetermined timing ($\theta 2$) during the compression stroke and before the ignition timing is changed in accordance with the operating state of the internal combustion engine.

9. A device for controlling an internal combustion engine, having a valve driving mechanism capable of varying the valve-opening characteristic in at least one of an intake valve and an exhaust valve so that the mixture of fuel and air is burnt in the interior of a combustion chamber to generate power, characterized in that the device comprises in-cylinder pressure detection means for detecting an in-cylinder pressure (Pc) within the combustion chamber, intake air amount calculation means for calculating an amount of air sucked in the combustion chamber (Mair) based on an intake air pressure ($Pm(\theta 1)$) during a valve-overlap of the intake valve and the exhaust valve, an exhaust gas pressure ($Pe(\theta 1)$) during the valve-overlap, the in-cylinder pressure ($Pc(\theta 2)$) detected by the in-cylinder pressure detection means during the compression stroke, and a gas-passage effective area (S) during the valve-overlap, ignition means for igniting the gaseous mixture in the combustion chamber, and ignition timing control means for determining the ignition timing ($\theta ig$) by the ignition means based on the intake air amount (Mair) calculated by the intake air amount calculation means.

* * * * *